(12) United States Patent
Paintin et al.

(10) Patent No.: US 8,762,267 B2
(45) Date of Patent: Jun. 24, 2014

(54) MONEY TRANSFER SYSTEM AND MESSAGING SYSTEM

(71) Applicant: The Western Union Company, Englewood, CO (US)

(72) Inventors: Scott Paintin, Littleton, CO (US); Lance Marr, Highlands Ranch, CO (US); Michelle Kloosterman, Denver, CO (US); Rebecca Loevenguth, Englewood, CO (US); Diane Scott, Lone Tree, CO (US)

(73) Assignee: The Western Union Company, Englewood, CO (US)

( * ) Notice: Subject to any disclaimer, the term of this patent is extended or adjusted under 35 U.S.C. 154(b) by 0 days.

(21) Appl. No.: 13/921,787

(22) Filed: Jun. 19, 2013

(65) Prior Publication Data

US 2013/0297494 A1    Nov. 7, 2013

Related U.S. Application Data

(63) Continuation of application No. 11/692,708, filed on Mar. 28, 2007, now Pat. No. 8,504,473.

(51) Int. Cl.
  *G06Q 40/00* (2012.01)
  *G06Q 10/00* (2012.01)
(52) U.S. Cl.
  USPC .................................. 705/39; 705/11; 705/35
(58) Field of Classification Search
  USPC ...................................................... 705/1.1, 35
  See application file for complete search history.

(56) References Cited

U.S. PATENT DOCUMENTS

| | | | |
|---|---|---|---|
| 1,109,127 | A | 9/1914 | Juengst |
| 2,362,134 | A | 11/1944 | Hoing |
| 3,599,151 | A | 8/1971 | Harr |
| 3,717,337 | A | 2/1973 | McCain et al. |
| 3,783,755 | A | 1/1974 | Lagin |

(Continued)

FOREIGN PATENT DOCUMENTS

| | | |
|---|---|---|
| AU | 763008 B2 | 1/2001 |
| CA | 1270326 | 6/1990 |

(Continued)

OTHER PUBLICATIONS

U.S. Appl. No. 10/047,917, filed Jan. 14, 2002, Kroon.

(Continued)

*Primary Examiner* — William Rankins
(74) *Attorney, Agent, or Firm* — Kilpatrick Townsend & Stockton, LLP

(57) ABSTRACT

A system for transferring funds from a sender to a recipient with a recorded message is disclosed. In one step the method includes receiving a request for a fund transfer from the sender. The sender may make the request for a fund transfer at a transaction processing device. In another step a payment is received from the sender for the fund transfer and a payment confirmation is transmitted to the host computer system. An identifier may then be assigned to the fund transfer. A recorded message from the sender may be received and at least a copy of the recorded message may be transmitted to a host computer system. The recorded message may then be associated with the fund transfer. A request, including the identifier, may be received from the recipient to receive the recorded messaged. In another step the recorded message may be sent to the recipient.

13 Claims, 3 Drawing Sheets

(56) References Cited

U.S. PATENT DOCUMENTS

| | | |
|---|---|---|
| 3,833,395 A | 9/1974 | Gosnell |
| 4,007,355 A | 2/1977 | Moreno |
| 4,032,931 A | 6/1977 | Haker |
| 4,060,228 A | 11/1977 | Tress et al. |
| 4,256,955 A | 3/1981 | Giraud et al. |
| 4,321,672 A | 3/1982 | Braun et al. |
| 4,385,285 A | 5/1983 | Horst et al. |
| 4,454,414 A | 6/1984 | Benton |
| 4,462,585 A | 7/1984 | Gieson et al. |
| 4,511,132 A | 4/1985 | Muller |
| 4,527,793 A | 7/1985 | Bottcher et al. |
| 4,528,643 A | 7/1985 | Freeny, Jr. |
| 4,562,340 A | 12/1985 | Tateisi et al. |
| 4,562,341 A | 12/1985 | Ohmae et al. |
| 4,577,848 A | 3/1986 | Hams |
| 4,594,663 A | 6/1986 | Nagata et al. |
| 4,630,200 A | 12/1986 | Ohmae et al. |
| 4,634,107 A | 1/1987 | Vandersyde et al. |
| 4,650,977 A | 3/1987 | Couch |
| 4,678,895 A | 7/1987 | Tateisi et al. |
| 4,697,246 A | 9/1987 | Zemke et al. |
| 4,700,055 A | 10/1987 | Kashkashian, Jr. |
| 4,718,657 A | 1/1988 | Otter et al. |
| 4,722,554 A | 2/1988 | Pettit |
| 4,723,212 A | 2/1988 | Mindrum et al. |
| 4,753,430 A | 6/1988 | Rowe et al. |
| 4,764,666 A | 8/1988 | Bergeron |
| 4,795,892 A | 1/1989 | Gilmore et al. |
| 4,812,628 A | 3/1989 | Boston et al. |
| 4,837,422 A | 6/1989 | Dethloff et al. |
| 4,864,618 A | 9/1989 | Wright et al. |
| 4,884,212 A | 11/1989 | Stutsman |
| 4,900,903 A | 2/1990 | Wright et al. |
| 4,902,881 A | 2/1990 | Janku |
| 4,910,672 A | 3/1990 | Off et al. |
| 4,941,090 A | 7/1990 | McCarthy |
| 4,961,142 A | 10/1990 | Elliott et al. |
| 4,972,318 A | 11/1990 | Brown et al. |
| 5,021,967 A | 6/1991 | Smith |
| 5,025,372 A | 6/1991 | Burton et al. |
| 5,027,316 A | 6/1991 | Frantz et al. |
| 5,029,208 A | 7/1991 | Tanaka |
| 5,053,607 A | 10/1991 | Carlson et al. |
| 5,056,019 A | 10/1991 | Schultz et al. |
| 5,082,268 A | 1/1992 | Santoro |
| 5,088,711 A | 2/1992 | Newsome |
| 5,117,355 A | 5/1992 | McCarthy |
| 5,119,293 A | 6/1992 | Hammond |
| 5,146,067 A | 9/1992 | Sloan et al. |
| 5,155,342 A | 10/1992 | Urano |
| 5,171,005 A | 12/1992 | Manley et al. |
| 5,173,851 A | 12/1992 | Off et al. |
| 5,175,682 A | 12/1992 | Higashiyama et al. |
| 5,185,695 A | 2/1993 | Pruchnicki |
| 5,200,889 A | 4/1993 | Mori |
| 5,202,826 A | 4/1993 | McCarthy |
| 5,216,229 A | 6/1993 | Copella et al. |
| 5,220,501 A | 6/1993 | Lawlor et al. |
| 5,231,569 A | 7/1993 | Myatt et al. |
| 5,233,167 A | 8/1993 | Markman et al. |
| 5,236,960 A | 8/1993 | Harrison et al. |
| 5,250,906 A | 10/1993 | Bills et al. |
| 5,255,182 A | 10/1993 | Adams |
| 5,283,829 A | 2/1994 | Anderson |
| 5,305,196 A | 4/1994 | Deaton et al. |
| 5,317,135 A | 5/1994 | Finocchio |
| 5,326,960 A | 7/1994 | Tannenbaum |
| 5,327,701 A | 7/1994 | Dronsfield |
| 5,334,823 A | 8/1994 | Noblett |
| 5,350,906 A | 9/1994 | Brody et al. |
| 5,352,876 A | 10/1994 | Watanabe et al. |
| 5,357,563 A | 10/1994 | Hamilton et al. |
| 5,367,452 A | 11/1994 | Gallery et al. |
| 5,371,798 A | 12/1994 | McWhortor |
| 5,386,458 A | 1/1995 | Nair et al. |
| 5,388,815 A | 2/1995 | Hill et al. |
| RE34,915 E | 4/1995 | Nichtberger et al. |
| 5,404,000 A | 4/1995 | Nair et al. |
| 5,408,077 A | 4/1995 | Campo et al. |
| 5,426,594 A | 6/1995 | Wright et al. |
| 5,428,210 A | 6/1995 | Nair et al. |
| 5,432,326 A | 7/1995 | Noblett, Jr. et al. |
| 5,432,506 A | 7/1995 | Chapman |
| 5,440,108 A | 8/1995 | Tran et al. |
| 5,448,043 A | 9/1995 | Nakano et al. |
| 5,448,471 A | 9/1995 | Deaton et al. |
| 5,461,217 A | 10/1995 | Claus |
| 5,464,971 A | 11/1995 | Sutcliffe et al. |
| 5,465,206 A | 11/1995 | Hilt et al. |
| 5,470,427 A | 11/1995 | Mikel et al. |
| 5,471,669 A | 11/1995 | Lidman |
| 5,475,603 A | 12/1995 | Korowotny |
| 5,477,037 A | 12/1995 | Berger |
| 5,477,038 A | 12/1995 | Levine et al. |
| 5,479,530 A | 12/1995 | Nair et al. |
| 5,483,444 A | 1/1996 | Heintzeman et al. |
| 5,483,445 A | 1/1996 | Pickering |
| 5,484,988 A | 1/1996 | Hills et al. |
| 5,513,102 A | 4/1996 | Auriemma |
| 5,513,117 A | 4/1996 | Small |
| 5,524,073 A | 6/1996 | Stambler |
| 5,530,232 A | 6/1996 | Taylor |
| 5,537,314 A | 7/1996 | Kanter |
| 5,546,523 A | 8/1996 | Gatto |
| 5,550,734 A | 8/1996 | Tarter et al. |
| 5,555,496 A | 9/1996 | Tackbary et al. |
| 5,557,516 A | 9/1996 | Hogan |
| 5,570,465 A | 10/1996 | Tsakanikas |
| 5,577,109 A | 11/1996 | Stimson et al. |
| 5,578,808 A | 11/1996 | Taylor |
| 5,586,036 A | 12/1996 | Pintsov |
| 5,590,038 A | 12/1996 | Pritod |
| 5,592,400 A | 1/1997 | Sasou |
| 5,604,802 A | 2/1997 | Holloway |
| 5,612,868 A | 3/1997 | Off et al. |
| 5,613,012 A | 3/1997 | Hoffman et al. |
| 5,614,703 A | 3/1997 | Martin et al. |
| 5,621,640 A | 4/1997 | Burke |
| 5,622,388 A | 4/1997 | Alcordo |
| 5,627,909 A | 5/1997 | Blaylock et al. |
| 5,629,982 A | 5/1997 | Micali |
| 5,637,845 A | 6/1997 | Kolls |
| 5,638,283 A | 6/1997 | Herbert |
| 5,642,485 A | 6/1997 | Deaton et al. |
| 5,644,723 A | 7/1997 | Deaton et al. |
| 5,647,583 A | 7/1997 | Emigh et al. |
| 5,649,114 A | 7/1997 | Deaton et al. |
| 5,649,117 A | 7/1997 | Landry |
| 5,650,604 A | 7/1997 | Marcous et al. |
| 5,657,201 A | 8/1997 | Kochis |
| 5,659,469 A | 8/1997 | Deaton et al. |
| 5,666,765 A | 9/1997 | Sarner et al. |
| 5,668,897 A | 9/1997 | Stolfo |
| 5,671,279 A | 9/1997 | Elgamal |
| 5,673,320 A | 9/1997 | Ray et al. |
| 5,677,955 A | 10/1997 | Doggett et al. |
| 5,678,010 A | 10/1997 | Pittenger et al. |
| 5,679,940 A | 10/1997 | Templeton et al. |
| 5,684,965 A | 11/1997 | Pickering |
| 5,686,713 A | 11/1997 | Rivera |
| 5,687,322 A | 11/1997 | Deaton et al. |
| 5,689,100 A | 11/1997 | Carrithers et al. |
| 5,699,528 A | 12/1997 | Hogan |
| 5,717,868 A | 2/1998 | James |
| 5,721,768 A | 2/1998 | Stimson et al. |
| 5,722,221 A | 3/1998 | Maltman et al. |
| 5,732,136 A | 3/1998 | Murphree et al. |
| 5,732,400 A | 3/1998 | Mandler et al. |
| 5,734,838 A | 3/1998 | Robinson et al. |
| 5,745,886 A | 4/1998 | Rosen |
| 5,754,654 A | 5/1998 | Hiroya et al. |
| 5,757,917 A | 5/1998 | Rose et al. |
| 5,760,381 A | 6/1998 | Stich et al. |
| 5,761,648 A | 6/1998 | Golden et al. |

(56) References Cited

U.S. PATENT DOCUMENTS

| | | |
|---|---|---|
| 5,764,789 A | 6/1998 | Pare et al. |
| 5,764,888 A | 6/1998 | Bolan et al. |
| 5,770,843 A | 6/1998 | Rose et al. |
| 5,774,870 A | 6/1998 | Storey |
| 5,774,879 A | 6/1998 | Custy et al. |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,790,677 A | 8/1998 | Fox et al. |
| 5,794,207 A | 8/1998 | Walker et al. |
| 5,796,832 A | 8/1998 | Kawan |
| 5,799,072 A | 8/1998 | Vulcan et al. |
| 5,801,365 A | 9/1998 | Katz |
| 5,804,806 A | 9/1998 | Haddad et al. |
| 5,805,719 A | 9/1998 | Pare et al. |
| 5,806,045 A | 9/1998 | Biorge et al. |
| 5,812,668 A | 9/1998 | Weber |
| 5,815,657 A | 9/1998 | Williams et al. |
| 5,825,617 A | 10/1998 | Kochis et al. |
| 5,825,881 A | 10/1998 | Colvin, Sr. |
| 5,826,241 A | 10/1998 | Stein et al. |
| 5,826,243 A | 10/1998 | Musmanno et al. |
| 5,828,875 A | 10/1998 | Halvarsson et al. |
| 5,832,457 A | 11/1998 | O'Brien et al. |
| 5,832,463 A | 11/1998 | Funk |
| 5,850,446 A | 12/1998 | Berger et al. |
| 5,855,007 A | 12/1998 | Jovicic et al. |
| 5,859,419 A | 1/1999 | Wynn |
| 5,864,830 A | 1/1999 | Armetta et al. |
| RE36,116 E | 2/1999 | McCarthy |
| 5,865,470 A | 2/1999 | Thompson |
| 5,868,236 A | 2/1999 | Rademacher |
| 5,870,718 A | 2/1999 | Spector |
| 5,873,072 A | 2/1999 | Kight et al. |
| 5,875,435 A | 2/1999 | Brown |
| 5,878,211 A | 3/1999 | Delagrange et al. |
| 5,880,446 A | 3/1999 | Mori et al. |
| 5,889,863 A | 3/1999 | Weber |
| 5,893,080 A | 4/1999 | McGurl et al. |
| 5,896,298 A | 4/1999 | Richter |
| 5,896,725 A | 4/1999 | Lundstrom et al. |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,633 A | 5/1999 | Lorsch |
| 5,903,721 A | 5/1999 | Sixtus |
| 5,903,880 A | 5/1999 | Biffar |
| 5,903,881 A | 5/1999 | Schrader et al. |
| 5,909,486 A | 6/1999 | Walker et al. |
| 5,909,492 A | 6/1999 | Payne et al. |
| 5,909,673 A | 6/1999 | Gregory |
| 5,910,988 A | 6/1999 | Ballard |
| 5,912,974 A | 6/1999 | Holloway et al. |
| 5,913,202 A | 6/1999 | Motoyama |
| 5,914,472 A | 6/1999 | Foladare et al. |
| 5,915,007 A | 6/1999 | Klapka |
| 5,915,023 A | 6/1999 | Bernstein |
| 5,915,024 A | 6/1999 | Kitaori et al. |
| 5,918,909 A | 7/1999 | Fiala et al. |
| 5,920,628 A | 7/1999 | Indeck et al. |
| 5,920,629 A | 7/1999 | Rosen |
| 5,920,847 A | 7/1999 | Kolling et al. |
| 5,920,848 A | 7/1999 | Schutzer et al. |
| 5,923,016 A | 7/1999 | Fredregill et al. |
| 5,924,080 A | 7/1999 | Johnson |
| 5,926,795 A | 7/1999 | Williams |
| 5,936,221 A | 8/1999 | Corder et al. |
| 5,937,396 A | 8/1999 | Konya |
| 5,940,811 A | 8/1999 | Norris |
| 5,943,424 A | 8/1999 | Berger et al. |
| 5,943,656 A | 8/1999 | Crooks et al. |
| 5,949,044 A | 9/1999 | Walker et al. |
| 5,949,885 A | 9/1999 | Leighton |
| 5,950,179 A | 9/1999 | Buchanan et al. |
| 5,952,639 A | 9/1999 | Ohki et al. |
| 5,953,709 A | 9/1999 | Gilbert et al. |
| 5,953,710 A | 9/1999 | Fleming |
| 5,956,700 A | 9/1999 | Landry |
| 5,960,412 A | 9/1999 | Tackbary et al. |
| 5,960,963 A | 10/1999 | Chodack et al. |
| 5,963,647 A | 10/1999 | Downing et al. |
| 5,969,318 A | 10/1999 | Mackenthun |
| 5,970,480 A | 10/1999 | Kalina |
| 5,974,146 A | 10/1999 | Randle et al. |
| 5,974,148 A | 10/1999 | Stambler |
| 5,974,194 A | 10/1999 | Tackbary et al. |
| 5,974,399 A | 10/1999 | Giuliani et al. |
| RE36,365 E | 11/1999 | Levine et al. |
| 5,975,514 A | 11/1999 | Emigh et al. |
| 5,983,003 A | 11/1999 | Lection et al. |
| 5,983,196 A | 11/1999 | Wendkos |
| 5,983,208 A | 11/1999 | Haller et al. |
| 5,984,181 A | 11/1999 | Kreft |
| 5,987,132 A | 11/1999 | Rowney |
| 5,987,140 A | 11/1999 | Rowney et al. |
| 5,987,426 A | 11/1999 | Goodwil, III |
| 5,987,429 A | 11/1999 | Maritzen et al. |
| 5,987,438 A | 11/1999 | Nakano et al. |
| 5,991,376 A | 11/1999 | Hennessy et al. |
| 5,991,413 A | 11/1999 | Arditti et al. |
| 5,991,748 A | 11/1999 | Taskett |
| 5,991,749 A | 11/1999 | Morrill, Jr. |
| 5,991,750 A | 11/1999 | Watson |
| 5,993,047 A | 11/1999 | Novogrod et al. |
| 5,995,976 A | 11/1999 | Walker et al. |
| 5,999,625 A | 12/1999 | Bellare et al. |
| 6,000,522 A | 12/1999 | Johnson |
| 6,000,608 A | 12/1999 | Dorf |
| 6,000,832 A | 12/1999 | Franklin et al. |
| 6,002,767 A | 12/1999 | Kramer |
| 6,002,771 A | 12/1999 | Nielsen |
| 6,003,763 A | 12/1999 | Gallagher et al. |
| 6,006,988 A | 12/1999 | Behrmann et al. |
| 6,009,411 A | 12/1999 | Kepecs |
| 6,009,412 A | 12/1999 | Storey |
| 6,009,415 A | 12/1999 | Shurling et al. |
| 6,011,833 A | 1/2000 | West |
| 6,012,045 A | 1/2000 | Barzilai et al. |
| 6,012,048 A | 1/2000 | Gustin et al. |
| 6,012,635 A | 1/2000 | Shimada et al. |
| 6,015,087 A | 1/2000 | Seifert et al. |
| 6,021,202 A | 2/2000 | Anderson et al. |
| 6,021,491 A | 2/2000 | Renaud |
| 6,021,943 A | 2/2000 | Chastain |
| 6,024,288 A | 2/2000 | Gottlich et al. |
| 6,026,370 A | 2/2000 | Jermyn |
| 6,026,379 A | 2/2000 | Haller et al. |
| 6,027,216 A | 2/2000 | Guyton |
| 6,029,150 A | 2/2000 | Kravitz |
| 6,029,888 A | 2/2000 | Harvey |
| 6,030,000 A | 2/2000 | Diamond |
| 6,032,133 A | 2/2000 | Hilt et al. |
| 6,032,136 A | 2/2000 | Brake, Jr. et al. |
| 6,032,137 A | 2/2000 | Ballard |
| 6,035,406 A | 3/2000 | Moussa et al. |
| 6,039,245 A | 3/2000 | Symonds et al. |
| 6,039,250 A | 3/2000 | Ito et al. |
| 6,044,362 A | 3/2000 | Neely |
| 6,045,039 A | 4/2000 | Stinson et al. |
| 6,047,268 A | 4/2000 | Bartoli et al. |
| 6,052,674 A | 4/2000 | Zervides et al. |
| 6,058,417 A | 5/2000 | Hess et al. |
| 6,061,660 A | 5/2000 | Eggleston et al. |
| 6,061,665 A | 5/2000 | Bahreman |
| 6,061,794 A | 5/2000 | Angelo et al. |
| 6,061,799 A | 5/2000 | Eldridge et al. |
| 6,064,990 A | 5/2000 | Goldsmith |
| 6,068,183 A | 5/2000 | Freeman et al. |
| 6,070,147 A | 5/2000 | Harms et al. |
| 6,070,150 A | 5/2000 | Remington et al. |

(56) References Cited

U.S. PATENT DOCUMENTS

| | | |
|---|---|---|
| 6,070,154 A | 5/2000 | Tavor et al. |
| 6,070,156 A | 5/2000 | Hartsell et al. |
| 6,070,798 A | 6/2000 | Nethery |
| 6,072,870 A | 6/2000 | Nguyen et al. |
| 6,073,121 A | 6/2000 | Ramzy |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,094,894 A | 8/2000 | Yates |
| 6,097,834 A | 8/2000 | Krouse et al. |
| 6,098,053 A | 8/2000 | Slater |
| 6,102,287 A | 8/2000 | Matyas, Jr. |
| 6,104,815 A | 8/2000 | Alcorn et al. |
| 6,105,009 A | 8/2000 | Cuervo |
| 6,106,020 A | 8/2000 | Leef et al. |
| 6,108,641 A | 8/2000 | Kenna et al. |
| 6,111,953 A | 8/2000 | Walker et al. |
| 6,119,105 A | 9/2000 | Williams |
| 6,119,106 A | 9/2000 | Mersky et al. |
| 6,119,931 A | 9/2000 | Novogrod |
| 6,119,933 A | 9/2000 | Wong et al. |
| 6,122,624 A | 9/2000 | Tetro et al. |
| 6,122,625 A | 9/2000 | Rosen |
| 6,129,275 A | 10/2000 | Urquhart et al. |
| 6,135,292 A | 10/2000 | Pettner |
| 6,138,911 A | 10/2000 | Fredregill et al. |
| 6,145,738 A | 11/2000 | Stinson et al. |
| 6,145,740 A | 11/2000 | Molano et al. |
| 6,148,377 A | 11/2000 | Carter et al. |
| 6,149,055 A | 11/2000 | Gatto |
| 6,149,056 A | 11/2000 | Stindon et al. |
| 6,164,043 A | 12/2000 | Miller et al. |
| 6,164,528 A | 12/2000 | Hills et al. |
| 6,167,386 A | 12/2000 | Brown |
| 6,169,975 B1 | 1/2001 | White et al. |
| 6,170,744 B1 | 1/2001 | Lee et al. |
| 6,175,823 B1 | 1/2001 | Van Dusen |
| 6,178,409 B1 | 1/2001 | Weber et al. |
| 6,181,814 B1 | 1/2001 | Carney |
| 6,182,219 B1 | 1/2001 | Feldbau et al. |
| 6,185,545 B1 | 2/2001 | Resnick et al. |
| 6,189,787 B1 | 2/2001 | Dorf |
| 6,193,152 B1 | 2/2001 | Fernando et al. |
| 6,193,155 B1 | 2/2001 | Walker et al. |
| 6,195,644 B1 | 2/2001 | Bowie |
| 6,199,761 B1 | 3/2001 | Drexler |
| 6,202,005 B1 | 3/2001 | Mahaffey |
| 6,202,054 B1 | 3/2001 | Lawlor et al. |
| 6,206,283 B1 | 3/2001 | Bansal et al. |
| 6,209,095 B1 | 3/2001 | Anderson et al. |
| RE37,122 E | 4/2001 | Levine et al. |
| 6,212,504 B1 | 4/2001 | Hayosh |
| 6,213,391 B1 | 4/2001 | Lewis |
| 6,216,277 B1 | 4/2001 | Goldstein et al. |
| 6,219,994 B1 | 4/2001 | Taniguchi |
| 6,222,914 B1 | 4/2001 | McMullin |
| 6,223,166 B1 | 4/2001 | Kay |
| 6,223,168 B1 | 4/2001 | McGurl et al. |
| 6,223,983 B1 | 5/2001 | Kjonaas et al. |
| 6,229,879 B1 | 5/2001 | Walker et al. |
| 6,233,340 B1 | 5/2001 | Sandru |
| 6,240,396 B1 | 5/2001 | Walker et al. |
| 6,246,996 B1 | 6/2001 | Stein et al. |
| 6,247,047 B1 | 6/2001 | Wolff |
| 6,253,027 B1 | 6/2001 | Weber et al. |
| 6,260,024 B1 | 7/2001 | Shkedy |
| 6,263,438 B1 | 7/2001 | Walker et al. |
| 6,263,446 B1 | 7/2001 | Kausik et al. |
| 6,267,366 B1 | 7/2001 | Graushar et al. |
| 6,269,369 B1 | 7/2001 | Robertson |
| 6,270,011 B1 | 8/2001 | Gottfried |
| 6,275,829 B1 | 8/2001 | Angiulo et al. |
| 6,278,979 B1 | 8/2001 | Williams |
| 6,282,516 B1 | 8/2001 | Giuliani |
| 6,282,522 B1 | 8/2001 | Davis et al. |
| 6,283,366 B1 | 9/2001 | Hills et al. |
| 6,286,756 B1 | 9/2001 | Stinson et al. |
| 6,289,322 B1 | 9/2001 | Kitchen et al. |
| 6,292,786 B1 | 9/2001 | Deaton et al. |
| 6,292,789 B1 | 9/2001 | Schutzer |
| 6,295,522 B1 | 9/2001 | Boesch |
| 6,298,335 B1 | 10/2001 | Bernstein |
| 6,298,336 B1 | 10/2001 | Davis et al. |
| 6,304,860 B1 | 10/2001 | Martin, Jr. et al. |
| 6,304,915 B1 | 10/2001 | Nguyen et al. |
| 6,305,604 B1 | 10/2001 | Ono |
| 6,308,887 B1 | 10/2001 | Korman et al. |
| 6,311,170 B1 | 10/2001 | Embrey |
| 6,314,169 B1 | 11/2001 | Schelberg, Jr. et al. |
| 6,314,519 B1 | 11/2001 | Davis et al. |
| 6,315,195 B1 | 11/2001 | Ramachandran |
| 6,317,745 B1 | 11/2001 | Thomas et al. |
| 6,321,210 B1 | 11/2001 | O'Brein et al. |
| 6,321,211 B1 | 11/2001 | Dodd |
| 6,321,984 B1 | 11/2001 | McCall et al. |
| 6,324,525 B1 | 11/2001 | Kramer et al. |
| 6,327,348 B1 | 12/2001 | Walker et al. |
| 6,327,570 B1 | 12/2001 | Stevens |
| 6,327,575 B1 | 12/2001 | Katz |
| 6,330,544 B1 | 12/2001 | Walker et al. |
| 6,330,546 B1 | 12/2001 | Gopinathan et al. |
| 6,334,108 B1 | 12/2001 | Deaton et al. |
| 6,336,099 B1 | 1/2002 | Barnett et al. |
| 6,345,261 B1 | 2/2002 | Feidelson et al. |
| 6,347,305 B1 | 2/2002 | Watkins |
| 6,349,242 B2 | 2/2002 | Mahaffey |
| 6,351,735 B1 | 2/2002 | Deaton et al. |
| 6,351,739 B1 | 2/2002 | Egendorf |
| 6,360,254 B1 | 3/2002 | Linden et al. |
| 6,367,013 B1 | 4/2002 | Bisbee et al. |
| 6,367,693 B1 | 4/2002 | Novogrod |
| 6,370,240 B1 | 4/2002 | Woynoski et al. |
| 6,370,514 B1 | 4/2002 | Messner |
| 6,373,950 B1 | 4/2002 | Rowney |
| 6,377,935 B1 | 4/2002 | Deaton et al. |
| 6,386,444 B1 | 5/2002 | Sullivan |
| 6,386,457 B1 | 5/2002 | Sorie |
| 6,394,343 B1 | 5/2002 | Berg et al. |
| 6,405,176 B1 | 6/2002 | Toohey |
| 6,405,182 B1 | 6/2002 | Cuervo |
| 6,408,284 B1 | 6/2002 | Hilt et al. |
| 6,409,080 B2 | 6/2002 | Kawagishi |
| 6,411,942 B1 | 6/2002 | Fujimoto |
| 6,415,271 B1 | 7/2002 | Turk et al. |
| 6,419,161 B1 | 7/2002 | Haddad et al. |
| 6,422,462 B1 | 7/2002 | Cohen |
| 6,424,949 B1 | 7/2002 | Deaton et al. |
| 6,424,951 B1 | 7/2002 | Shurling et al. |
| 6,438,586 B1 | 8/2002 | Hass |
| 6,442,529 B1 | 8/2002 | Krishan et al. |
| 6,449,599 B1 | 9/2002 | Payne et al. |
| 6,449,616 B1 | 9/2002 | Walker et al. |
| 6,450,407 B1 | 9/2002 | Freeman et al. |
| 6,453,300 B2 | 9/2002 | Simpson |
| 6,467,684 B2 | 10/2002 | Fite et al. |
| 6,468,155 B1 | 10/2002 | Zucker et al. |
| 6,473,500 B1 | 10/2002 | Risafi et al. |
| 6,473,794 B1 | 10/2002 | Guheen et al. |
| 6,484,936 B1 | 11/2002 | Nicoll et al. |
| 6,488,203 B1 | 12/2002 | Stoutenburg et al. |
| 6,496,809 B1 | 12/2002 | Nakfoor |
| 6,502,745 B1 | 1/2003 | Stimson et al. |
| 6,502,747 B1 | 1/2003 | Stoutenburg et al. |
| 6,505,179 B1 | 1/2003 | Kara |
| 6,510,453 B1 | 1/2003 | Apfel et al. |
| 6,510,516 B1 | 1/2003 | Benson et al. |
| 6,510,983 B2 | 1/2003 | Horowitz et al. |
| 6,516,302 B1 | 2/2003 | Deaton et al. |
| 6,516,357 B1 | 2/2003 | Hamann et al. |
| 6,519,571 B1 | 2/2003 | Guheen et al. |
| 6,523,067 B2 | 2/2003 | Mi et al. |
| 6,526,130 B1 | 2/2003 | Paschini |
| 6,532,451 B1 | 3/2003 | Schell et al. |

(56) References Cited

U.S. PATENT DOCUMENTS

| | | |
|---|---|---|
| 6,536,037 B1 | 3/2003 | Guheen et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,561,339 B1 | 5/2003 | Olson et al. |
| 6,565,000 B2 | 5/2003 | Sehr |
| 6,571,339 B1 | 5/2003 | Danneels et al. |
| 6,575,358 B2 | 6/2003 | O'Callaghan et al. |
| 6,575,361 B1 | 6/2003 | Graves et al. |
| 6,578,014 B1 | 6/2003 | Murcko, Jr. |
| 6,588,658 B1 | 7/2003 | Blank |
| 6,601,038 B1 | 7/2003 | Kolls |
| 6,606,744 B1 | 8/2003 | Mikurak |
| 6,609,113 B1 | 8/2003 | O'Leary et al. |
| RE38,255 E | 9/2003 | Levine et al. |
| 6,615,166 B1 | 9/2003 | Guheen et al. |
| 6,615,190 B1 | 9/2003 | Slater |
| 6,651,885 B1 | 11/2003 | Arias |
| 6,670,569 B2 | 12/2003 | Smith et al. |
| 6,671,818 B1 | 12/2003 | Mikurak |
| 6,678,664 B1 | 1/2004 | Ganesan |
| 6,701,216 B2 | 3/2004 | Miller et al. |
| 6,704,714 B1 | 3/2004 | O'Leary et al. |
| 6,708,176 B2 | 3/2004 | Strunk et al. |
| 6,721,713 B1 | 4/2004 | Guheen et al. |
| 6,732,916 B1 | 5/2004 | Fazzano |
| 6,732,922 B2 | 5/2004 | Lindgren et al. |
| 6,733,387 B2 | 5/2004 | Walker et al. |
| 6,736,314 B2 | 5/2004 | Cooper et al. |
| 6,738,689 B2 | 5/2004 | Sansone |
| 6,760,711 B1 | 7/2004 | Gillett et al. |
| 6,792,110 B2 | 9/2004 | Sandru |
| 6,801,833 B2 | 10/2004 | Pintsov |
| 6,802,500 B2 | 10/2004 | Bennett et al. |
| 6,827,260 B2 | 12/2004 | Stoutenburg et al. |
| 6,844,660 B2 | 1/2005 | Scott |
| 6,886,742 B2 | 5/2005 | Stoutenburg et al. |
| 6,907,408 B2 | 6/2005 | Angel |
| 6,911,910 B2 | 6/2005 | Sansone et al. |
| 6,943,312 B2 | 9/2005 | Zimmermann |
| 6,950,810 B2 | 9/2005 | Lapsley et al. |
| 7,073,242 B2 | 7/2006 | Bennett et al. |
| 7,086,584 B2 | 8/2006 | Stoutenburg et al. |
| 7,092,916 B2 | 8/2006 | Diveley et al. |
| 7,099,878 B2 | 8/2006 | Bruce et al. |
| 7,103,577 B2 | 9/2006 | Blair et al. |
| 7,104,439 B2 | 9/2006 | Dewan et al. |
| 7,104,440 B2 | 9/2006 | Hansen et al. |
| 7,107,249 B2 | 9/2006 | Dively et al. |
| 7,120,606 B1 | 10/2006 | Ranzini et al. |
| 2001/0001856 A1 | 5/2001 | Gould et al. |
| 2001/0018660 A1 | 8/2001 | Sehr |
| 2001/0023409 A1 | 9/2001 | Keil |
| 2001/0023415 A1 | 9/2001 | Keil |
| 2001/0025879 A1 | 10/2001 | Kawagishi |
| 2001/0032878 A1 | 10/2001 | Tsiounis et al. |
| 2001/0034720 A1 | 10/2001 | Armes |
| 2001/0037316 A1 | 11/2001 | Shiloh |
| 2001/0037455 A1 | 11/2001 | Lawandy et al. |
| 2001/0042785 A1 | 11/2001 | Walker et al. |
| 2001/0047330 A1 | 11/2001 | Gephart et al. |
| 2001/0047342 A1 | 11/2001 | Cuervo |
| 2001/0051876 A1 | 12/2001 | Seigel et al. |
| 2001/0051920 A1 | 12/2001 | Joao et al. |
| 2001/0054003 A1 | 12/2001 | Chien et al. |
| 2002/0007320 A1 | 1/2002 | Hogan et al. |
| 2002/0016769 A1 | 2/2002 | Barbara et al. |
| 2002/0022966 A1 | 2/2002 | Horgan |
| 2002/0023055 A1 | 2/2002 | Antognini et al. |
| 2002/0026412 A1 | 2/2002 | Kabin |
| 2002/0032653 A1 | 3/2002 | Schutzer |
| 2002/0038289 A1 | 3/2002 | Lawlor et al. |
| 2002/0040346 A1 | 4/2002 | Kwan |
| 2002/0046106 A1 | 4/2002 | Ishibashi et al. |
| 2002/0046116 A1 | 4/2002 | Hohle et al. |
| 2002/0062253 A1 | 5/2002 | Dosh, Jr. et al. |
| 2002/0062285 A1 | 5/2002 | Amann |
| 2002/0065712 A1 | 5/2002 | Kawan |
| 2002/0065716 A1 | 5/2002 | Kuschill |
| 2002/0067827 A1 | 6/2002 | Kargman |
| 2002/0076018 A1 | 6/2002 | Banks et al. |
| 2002/0079364 A1 | 6/2002 | Davies |
| 2002/0082920 A1 | 6/2002 | Austin et al. |
| 2002/0087337 A1 | 7/2002 | Hensley |
| 2002/0087462 A1 | 7/2002 | Stoutenburg et al. |
| 2002/0087463 A1 | 7/2002 | Fitzgerald et al. |
| 2002/0087467 A1 | 7/2002 | Mascavage et al. |
| 2002/0087469 A1 | 7/2002 | Ganesan et al. |
| 2002/0088851 A1 | 7/2002 | Hodes |
| 2002/0091573 A1 | 7/2002 | Hodes |
| 2002/0095387 A1 | 7/2002 | Sosa et al. |
| 2002/0099601 A1 | 7/2002 | Farrell |
| 2002/0099607 A1 | 7/2002 | Sosa et al. |
| 2002/0103746 A1 | 8/2002 | Moffett et al. |
| 2002/0104026 A1 | 8/2002 | Barra et al. |
| 2002/0107797 A1 | 8/2002 | Combaluzier |
| 2002/0111908 A1 | 8/2002 | Milberger et al. |
| 2002/0112236 A1 | 8/2002 | Sukeda et al. |
| 2002/0120514 A1 | 8/2002 | Hagmeier et al. |
| 2002/0120582 A1 | 8/2002 | Elston et al. |
| 2002/0120846 A1 | 8/2002 | Stewart et al. |
| 2002/0123926 A1 | 9/2002 | Bushold et al. |
| 2002/0123962 A1 | 9/2002 | Bryman et al. |
| 2002/0128922 A1 | 9/2002 | Joao |
| 2002/0143566 A1 | 10/2002 | Diveley et al. |
| 2002/0143626 A1 | 10/2002 | Voltmer et al. |
| 2002/0143706 A1 | 10/2002 | Diveley et al. |
| 2002/0143709 A1 | 10/2002 | Diveley et al. |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0156683 A1 | 10/2002 | Stoutenburg et al. |
| 2002/0161702 A1 | 10/2002 | Milberger et al. |
| 2002/0166891 A1 | 11/2002 | Stoutenburg et al. |
| 2002/0169719 A1 | 11/2002 | Dively et al. |
| 2002/0170954 A1 | 11/2002 | Zingher et al. |
| 2002/0174016 A1 | 11/2002 | Cuervo |
| 2002/0174334 A1 | 11/2002 | Meadow et al. |
| 2002/0184152 A1 | 12/2002 | Martin |
| 2002/0198806 A1 | 12/2002 | Blagg et al. |
| 2003/0009382 A1 | 1/2003 | D'Arbeloff et al. |
| 2003/0014371 A1 | 1/2003 | Turgeon |
| 2003/0023552 A1 | 1/2003 | Kight et al. |
| 2003/0024979 A1 | 2/2003 | Hansen et al. |
| 2003/0028491 A1 | 2/2003 | Cooper |
| 2003/0044043 A1 | 3/2003 | Kaneda |
| 2003/0047605 A1 | 3/2003 | Mcclure et al. |
| 2003/0053609 A1 | 3/2003 | Risafi et al. |
| 2003/0055689 A1 | 3/2003 | Block et al. |
| 2003/0055780 A1 | 3/2003 | Hansen et al. |
| 2003/0061157 A1 | 3/2003 | Hirka et al. |
| 2003/0061171 A1 | 3/2003 | Gilbert et al. |
| 2003/0065624 A1 | 4/2003 | James et al. |
| 2003/0069856 A1 | 4/2003 | Seifert et al. |
| 2003/0085161 A1 | 5/2003 | Smith et al. |
| 2003/0088552 A1 | 5/2003 | Bennett et al. |
| 2003/0111529 A1 | 6/2003 | Templeton et al. |
| 2003/0120571 A1 | 6/2003 | Blagg |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0135438 A1 | 7/2003 | Blagg et al. |
| 2003/0135459 A1 | 7/2003 | Abelman et al. |
| 2003/0145205 A1 | 7/2003 | Sarcanin |
| 2003/0149662 A1 | 8/2003 | Shore |
| 2003/0154164 A1 | 8/2003 | Mascavage et al. |
| 2003/0158818 A1 | 8/2003 | George et al. |
| 2003/0163417 A1 | 8/2003 | Cachey et al. |
| 2003/0167231 A1 | 9/2003 | Winking et al. |

(56) References Cited

U.S. PATENT DOCUMENTS

| | | |
|---|---|---|
| 2003/0167237 A1 | 9/2003 | Degen et al. |
| 2003/0168510 A1 | 9/2003 | Allen |
| 2003/0171992 A1 | 9/2003 | Blagg |
| 2003/0177067 A1 | 9/2003 | Cowell et al. |
| 2003/0182218 A1 | 9/2003 | Blagg |
| 2003/0182247 A1 | 9/2003 | Mobed et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0195811 A1 | 10/2003 | Hayes et al. |
| 2003/0208445 A1 | 11/2003 | Compiano |
| 2003/0212620 A1 | 11/2003 | Blagg |
| 2003/0212629 A1 | 11/2003 | King |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2003/0225708 A1 | 12/2003 | Park et al. |
| 2003/0236728 A1 | 12/2003 | Sunderji et al. |
| 2004/0002918 A1 | 1/2004 | McCarthy et al. |
| 2004/0015438 A1 | 1/2004 | Compiano et al. |
| 2004/0024701 A1 | 2/2004 | Hansen et al. |
| 2004/0030657 A1 | 2/2004 | Holm-Blagg et al. |
| 2004/0039702 A1* | 2/2004 | Blair et al. ................. 705/43 |
| 2004/0049316 A1 | 3/2004 | Pintsov et al. |
| 2004/0054622 A1 | 3/2004 | Strayer et al. |
| 2004/0059672 A1 | 3/2004 | Baig et al. |
| 2004/0065726 A1 | 4/2004 | McGee et al. |
| 2004/0068437 A1 | 4/2004 | McGee et al. |
| 2004/0078327 A1 | 4/2004 | Frazier et al. |
| 2004/0083170 A1 | 4/2004 | Bam et al. |
| 2004/0088248 A1 | 5/2004 | Cutler |
| 2004/0088261 A1 | 5/2004 | Moore et al. |
| 2004/0098326 A1 | 5/2004 | James et al. |
| 2004/0098328 A1 | 5/2004 | Grant et al. |
| 2004/0098335 A1 | 5/2004 | Michelsen |
| 2004/0107165 A1 | 6/2004 | Blair et al. |
| 2004/0117302 A1 | 6/2004 | Weichert et al. |
| 2004/0118914 A1 | 6/2004 | Smith et al. |
| 2004/0138947 A1 | 7/2004 | McGee et al. |
| 2004/0138989 A1 | 7/2004 | O'Malley |
| 2004/0139004 A1 | 7/2004 | Cohen et al. |
| 2004/0139008 A1 | 7/2004 | Mascavage et al. |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0158532 A1 | 8/2004 | Breck et al. |
| 2004/0167821 A1 | 8/2004 | Baumgartner |
| 2004/0167860 A1 | 8/2004 | Baxter et al. |
| 2004/0169722 A1 | 9/2004 | Pena |
| 2004/0186773 A1 | 9/2004 | George et al. |
| 2004/0193487 A1 | 9/2004 | Purcell et al. |
| 2004/0193551 A1 | 9/2004 | McGee et al. |
| 2004/0193897 A1 | 9/2004 | Van Volkenburgh |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0210830 A1 | 10/2004 | Algiene |
| 2004/0211831 A1 | 10/2004 | Stoutenburg et al. |
| 2004/0254833 A1 | 12/2004 | Algiene et al. |
| 2004/0260607 A1 | 12/2004 | Robbins et al. |
| 2005/0004702 A1 | 1/2005 | McDonald |
| 2005/0017607 A1 | 1/2005 | Weinberger |
| 2005/0077744 A1 | 4/2005 | Bennett et al. |
| 2005/0091110 A1 | 4/2005 | Hentz et al. |
| 2005/0097037 A1 | 5/2005 | Tibor |
| 2005/0107152 A1 | 5/2005 | McGee et al. |
| 2005/0108127 A1 | 5/2005 | Brown |
| 2005/0125360 A1 | 6/2005 | Tidwell et al. |
| 2005/0137986 A1 | 6/2005 | Kean |
| 2005/0159993 A1 | 7/2005 | Kordas et al. |
| 2005/0167481 A1 | 8/2005 | Hansen et al. |
| 2005/0173520 A1 | 8/2005 | Jaros et al. |
| 2005/0180550 A1 | 8/2005 | McGee et al. |
| 2005/0187929 A1 | 8/2005 | Staggs |
| 2005/0209958 A1 | 9/2005 | Michelsen |
| 2005/0209961 A1 | 9/2005 | Michelsen |
| 2005/0211760 A1 | 9/2005 | Dewan et al. |
| 2005/0261967 A1 | 11/2005 | Barry et al. |
| 2005/0289024 A1 | 12/2005 | Hahn-Carlson et al. |
| 2006/0036496 A1* | 2/2006 | Cowell et al. .................. 705/14 |
| 2006/0149667 A1 | 7/2006 | Barry |
| 2006/0251225 A1* | 11/2006 | Gomez-Ortigoza ..... 379/114.01 |
| 2008/0109280 A1* | 5/2008 | Csoka ................. 705/7 |

FOREIGN PATENT DOCUMENTS

| | | |
|---|---|---|
| CA | 1299291 | 4/1992 |
| CA | 2094281 | 4/1992 |
| CA | 2175473 | 5/1995 |
| CA | 2271178 | 7/1999 |
| CA | 2333692 | 10/1999 |
| CA | 2276641 | 12/2000 |
| CA | 2383173 | 1/2001 |
| CA | 2432025 | 6/2001 |
| CA | 2225427 | 12/2001 |
| CA | 2402993 | 7/2002 |
| CA | 2462398 A1 | 12/2002 |
| CA | 2452958 A1 | 1/2003 |
| EP | 0 253 240 A1 | 1/1988 |
| EP | 481135 A1 | 4/1992 |
| EP | 50234 A2 | 5/1993 |
| EP | 700023 A1 | 8/1995 |
| EP | 745961 A2 | 4/1996 |
| EP | 0 933 717 A2 | 8/1999 |
| EP | 0 933 717 A3 | 8/1999 |
| EP | 0 836 727 B1 | 9/1999 |
| EP | 949596 A2 | 10/1999 |
| EP | 725376 A2 | 11/1999 |
| EP | 843292 A3 | 11/1999 |
| EP | 0 987 642 A2 | 3/2000 |
| EP | 1 011 060 A1 | 6/2000 |
| EP | 1077436 A2 | 2/2001 |
| EP | 1 139 252 A2 | 10/2001 |
| EP | 1 232 776 A2 | 8/2002 |
| FR | 2728983 A1 | 7/1996 |
| GB | 2 274 349 A | 7/1994 |
| JP | 0 2217990 A | 8/1990 |
| JP | 0 9054851 A | 2/1997 |
| JP | 0 9084951 A | 3/1997 |
| JP | 0 9193580 A | 7/1997 |
| JP | 10-249052 A | 9/1998 |
| JP | 2006235670 A * | 9/2006 |
| WO | 93/08546 A1 | 4/1993 |
| WO | 96 26508 A1 | 8/1996 |
| WO | 96 33385 A1 | 10/1996 |
| WO | 96 38801 A1 | 12/1996 |
| WO | 97 17212 A1 | 5/1997 |
| WO | 97/43893 | 11/1997 |
| WO | 98 13794 A1 | 4/1998 |
| WO | 98 49644 A1 | 11/1998 |
| WO | 98 50875 A2 | 11/1998 |
| WO | 98/06050 A | 12/1998 |
| WO | 99 22291 A1 | 5/1999 |
| WO | 99 28872 A1 | 6/1999 |
| WO | 99/66436 A1 | 12/1999 |
| WO | 00/21004 A | 4/2000 |
| WO | 00/22559 A1 | 4/2000 |
| WO | 00/46725 A1 | 8/2000 |
| WO | 00/54122 A2 | 9/2000 |
| WO | 00/67177 A2 | 11/2000 |
| WO | 00/79452 A2 | 12/2000 |
| WO | 01/04816 A1 | 1/2001 |
| WO | 01/04846 A1 | 1/2001 |
| WO | 01/33522 A1 | 5/2001 |
| WO | 01/39093 A1 | 5/2001 |
| WO | 01 69347 A3 | 9/2001 |
| WO | 01/75744 A1 | 10/2001 |
| WO | 01/86600 A2 | 11/2001 |
| WO | 01/92989 A2 | 12/2001 |
| WO | 02/01469 A2 | 1/2002 |
| WO | 02/05195 A1 | 1/2002 |
| WO | 02/39368 A1 | 5/2002 |

(56) References Cited

FOREIGN PATENT DOCUMENTS

| WO | 2004/008372 A2 | 1/2004 |
|---|---|---|
| WO | 2004/008399 A2 | 1/2004 |
| WO | 94/21066 A1 | 9/2004 |

OTHER PUBLICATIONS

U.S. Appl. No. 10/773,642, filed Feb. 6, 2004, Sgambati et al.
About Western Union: Company History; http://www.payment-solutions.com/history.html, 2005, 3 pages.
Aeromexico and Western Union Partner to Offer a Cash Payment Option for Booking Airline Tickets; 2004, Press Release, 2 pages.
American Express in New Ad Drive; 1990, American Banker, 1 page.
American Express Introduces Automated Money Order Dispenser; 1991, Professional Check Casher, 1 page.
American Express Money Orders, Travelers Cheques Now on Sale; 1936, Dots and Dashes, 2 pages.
American Greeting Cards Click-Through; no date, 38 pages.
Amex aims expansion strategy at local currency exchanges; 1990, Crain's Chicago Business, 1 page.
Amex Money Order Dispenser; 1990, The Nilson Report, 1 page.
Amex tests Moneygram; 1990, Adnews, 1 page.
And a Nine—Second Money Order Dispenser; 1991, Post-News, vol. 17, No. 1, 1 page.
Announcing Quick Collect Online; 2002, Western Union's Professional Collector, 3 pages.
Annual Report of First Data Corporation; 1998, 3 pages.
Annual Report of First Data Corporation; 1999, 2 pages.
Annual Report of the President of the Western Union Telegraph Company, 1873, pp. 8-11.
Annual Report of the Western Union Corporation; 1990, 4 pages.
Annual Report of the Western Union Telegraph Company; 1935, 2 pages.
Annual Report of the Western Union Telegraph Company; 1940, pp. 9 and 22.
Annual Report of the Western Union Telegraph Company; 1947, 2 pages.
Annual Report of the Western Union Telegraph Company; 1949, 2 pages.
Annual Report of the Western Union Telegraph Company; 1951, 2 pages.
Annual Report of the Western Union Telegraph Company; 1953, 2 pages.
Annual Report of the Western Union Telegraph Company; 1954, 3 pages.
Annual Report of the Western Union Telegraph Company; 1973, 5 pages.
Annual Report of the Western Union Telegraph Company; 1974, 2 pages.
Annual Report of the Western Union Telegraph Company; 1981, 2 pages.
AT&T Wireless to Offer Western Union SwiftPay as Replenishment Option for AT&T Free2Go Wireless Prepaid Customers; 2001, PR Newswire Association, 2 pages.
Behind the Scenes of Life; 1996, First Data Corporation Annual Report, 3 pages.
Bidpay.com: Whois search results; 2003, http://www.networksolutions.com/en_US/whois/results.jhtml;jsessionid+VZDZVYDD1J, 2 pages.
BidPay: Seller FAQs—Receiving Payments and Using the Money Order Service; 1999-2003, 7 pages.
billserv.com Launches bills.com, an internet Portal for Consumers to Pay All Bills Online at No Cost; 2000, Business Wire, 2 pages.
Boneh, Dan "Beaming Money by Email is Web's Next killer App", PR Newswire, Nov. 16, 1999, pp. 1-4.
Business Wire, "E-Commerce, Email and E-greeting Cards Combine in New Web Site Designed by Interactive Bureau", Sep. 14, 1999 (abstract), [online] [retrieved on May 1, 2002], retrieved from PROQUEST Database, 2 pages.
Candygram payment service, no date, 1 page.

CES/NaBANCO Introduces Stored Value Card Technology: Blockbuster Video is First Merchant Partner; 1996, First Data Corporation News Release, 3 pages.
Collect your delinquent accounts by Telegraph; 1933, Form 1229-A, 1 page.
Collection by Money Transfer: MoneyGram Service Removes Time-Consuming Steps to Commercial Collections; 1990, Collector, p. 36.
Common Values: Uncommon Opportunities; 1995, First Data Corporation Annual Report, 2 pages.
Company Profile: The Western Union Convenience Pay Service; 2004, 4 pages.
DOTBANK, "The Way to Send and Receive Money on the Internet," download from website http://www.dotbank.com, Feb. 7, 2000, 6 pages.
Dots and Dashes; 1935, vol. 11, No. 9, 4 pages.
FDR to Offer HNC Software's Real-Time Fraud Detection: New distribution Agreement to Benefit Card Banks; 1996, First Data Resources News Release, 3 pages.
Federal Benefits Checks are Going Away-Don't Let Your Customers Go with Them: Announcing the Western Union Benefits Quick Cash Program; 4 pages.
First Data Acquires PaySys International; 2001, Press Release, 2 pages.
First Data Aligns with CyberCash to Offer New Electronic Coin Service; 1996, First Data Corporation News Release, 3 pages.
First Data and Netscape Announce Program to Help Businesses Establish Payment-Enabled Web Sites; 1996, First Data Corporation News Release, 5 pages.
First Data and Netscape Offering Internet Payment Processing Service; 1996, First Data Corporation News Release, 3 pages.
First Data InfoSource Offers Database Analysis with DecisionScope; 1996, First Data Corporation News Release, 2 pages.
First Data to Offer Card Profitability Software from HNC: Distribution Agreement Poised to Repeat Falcon Success;1996, HNC Software, Inc. News Release, 3 pages.
First Data, First USA Paymentech, GE Capital Invest in First Virtual Holdings; 1996, First Virtual Holdings Corporation News Release, 3 pages.
First located example of a money transfer; Aug. 25, 1873, 1 page.
Get your Collect Card; 1939, Dots and Dashes, 2 pages.
Guess What? The check's not in the mail; 2001, Western Union's Professional Collector, 3 pages.
Hoffman, Karen Epper "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.
How many by phone was paid;; Money Transfer Service: Book of Rules and List of Offices; 1926, Western Union Telegraph Company, 3 pages.
If you're not getting your payment with Quick Collect, chances are you're not getting it; 2001, 2 pages.
Introducing the Western Union Cash Card Program; 1998, 2 pages.
It takes a certain person to make a good collector. But it takes a good manager to make a champion; 2001, Western Union's Professional Collector, 3 pages.
Lan Airline Alliance Carriers and Western Union Offer Travelers Additional Payment Options; 2005, 3 pages.
Last of the Pony Express Riders Tells His Story; 1932, Dots and Dashes, vol. 8, No. 10, 2 pages.
Latour, Almar "PayPal Electronic Plan May be on the Money in Years to Come", The Wall Street Journal Interactive Edition, Nov. 15, 1999, downloaded from www.paypal.com/html/wsj.html, 2 pages.
Lawton, George; "Biometrics: a New Era in Security"; 1998, Computer, vol. 31, No. 8, pp. 16-18.
Levin, Gary; "Western Union not fading into sunset; new services are added as telegrams drop"; 1992, 2 pages.
List of Prepaid Services; http://www.westernunion.com/info/osComparePrePaid.asp, 1 page.
Loved one stranded? Send Cash; 1991, Akron Beacon Journal, 2 pages.
Luxury Brands LLC: World Famous Brands at Liquidation Prices; http://www.auctionbytes.com/cab/pages/payment, 3 pages.

(56) References Cited

OTHER PUBLICATIONS

Messenger Work Full of Adventure, Excitement; 1933, Dots and Dashes, vol. 9, No. 11, 2 pages.
Money Order with confirmation; 1948, 1 page.
Money Orders by Phone; 1935, Fortune Magazine, 3 pages.
Money-wire giants battle for business: Currency exchanges wooed; 1991, Chicago Sun Times, 2 pages.
Retrieved from http://www.MoneyZap.com. "Greeting Card Process Flow"; 2000, 2 pages.
Nation Receives Time Over Western Union Network; 1931, Dots and Dashes, vol. 7, No. 5, 2 pages.
Nationwide Credit Collectors Act Globally; 2001, Western Union's Professional Collector, 3 pages.
New Western Union SwiftPay Service Continues Expansion of Consumer-to-Business Payment Options; 1999, PR Newswire Association, 2 pages.
NTS Completes Merger with EDS Fleet Services; New First Data Unit Sets Sights on New Markets; 1996, NTS Press Release, 3 pages.
Only Western Union, no date, 2 pages.
PayPal for the Palm; http://handheldnews.com/file.asp?ObjectID=5401, Printed date Oct. 10, 2003; 2 pages.
PayPal.com Case Study; http://fox.rollins.edu/~slackman/PayPal.htm, 2003, 7 pages.
PayPal: The way to send and receive money online; 2002; 4 pages.
PayPal-News; http://www.ndrys.com/paypal.html, 2003, 3 pages.
PaySys—company overview, no date, 2 pages.
PaySys signs up four Asian distributors; 1997 Orlando Business Journal, 3 pages.
Picture of Bill payment form or advertisement, no date, 1 page.
Pilgrims Started Thanksgiving Custom; Dots and Dashes, vol. 4, No. 11, Nov. 1928, 2 pages.
Plotkin, Hal "Beam Me Up Some Cash" Silicon Valley Insider, Sep. 8, 1999, www.halplotkin.com/cnbcs029.htm, 3 pages.
Press Release: "Western Union Announces ATM Card Payout for Money Transfer Transactions"; 2001, URL: http://news.firstdata.com/media/ReleaseDetail.cfm?ReleaseID=849995>.
Products and Services from PaySys, no date, 2 pages.
Purchasing American Airlines Tickets Just Got Easier; 2005, 4 pages.
Quick Cash and Quick Collect: Western Union's money-movers; 1990, *Newsbriefs*, vol. 2, No. 1, 3 pages.
Quick Cash: A safe and reliable way to send funds around the world; http://www.payment-solutions.com/quickcash.html, 1 page.
Quick Collect Sales Presentation; Jan. 2004, 28 pages.
Quick Collect: Government/Child Support Agency Name, Training Guide; 2004, 8 pages.
Quick Collect; Western Union Training Guide; 2004, 10 pages.
Quick Pay: The Convenient and reliable way to receive payments from customers worldwide; http://www.payment-solutions.com/quickpay.html, 2005, 3 pages.
Refund of Money Transfers; 1913, Journal of the Telegraph, 2 pages.
Remittance for order sent via Western Union; 1933, 2 pages.
Reynolds Arcade was Western Union Birthplace; 1933, Dots and Dashes, vol. 9, No. 8, 2 pages.
Rhode Island becomes first state to accept child support payments at Western Union: Government Payment Leader govONE Solutions Adds Walk-in to Full Suite of Payment Options; 2002, 3 pages.
Rhode Island becomes first state to accept child support payments at Western Union: More than 50 Western Union Convenience Pay Agent Locations Offer New Level of Convenience to Rhode Island Residents Who Pay Child Support—; 2002, 3 pages.
SBC Communications adds Western Union Locations for Walk-in Customer Bill Payments; SBC News Release, Sep. 7, 2005, 2 pages.
Send your payment using Western Union Quick Collect; Feb. 2, 2004 2 pages.
Send Your Utility Bill Payment from Here!; no date 3 pages.
Sending Cash in a Flash; 1990, Travel & Leisure, p. 42.
Sending Cash in a Flash: There are more ways to do it than you might think; 1991, 2 pages.
Shopping Order service and gift service; 1934, Western Union Telegraph Company, Money Order Book, 6 pages.
Signature Services: Helping financial institutions send funds faster; http://www.payment-solutions.com/signature.html, 205, 1 page.
State of Hawaii to Accept Child Support Payments at Western Union; 2004, 2 pages.
State of New York Banking Department: Staff Letters and Memoranda; 2000, http://www.banking.state.ny.us/lo000718.htm, 2 pages.
Steiner, Ina "PayPal Online Payment Service—Another Way to Pay for Auction Items" www.auctionbytes.com, Feb. 20, 2000, 4 pages.
Steiner, Ina: "Accepting Credit Cards When You Sell Items: ProPay and Billpoint Payment Services"; 2000 Auction Bytes, 4 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Stockel, Anna; "Securing Data and Financial Transactions"; 1995, Institute of Electrical and Electronics Engineers 29th Annual Conference, pp. 397-401.
Survey of services; 1960, pp. 2-31.
The Western Union Telegraph Company: Delivery Department Instructions; 1926, Commercial Bulletin No. 9-A, 2 pages.
The Western Union Telegraph Company: Instructions for Receiving Clerks; 1929, Commercial Bulletin No. 37-A, 2 pages.
The Western Union Telegraph Company: Rules for Money Transfer Service; 1908, pp. 3-25.
The Yellow Blank is Correct for every social need; 1930, Western Union Booklet, 2 pages.
The Yellow Blank: When, Why, How to Use It; 1934, 5 pages.
To send a Quick Collect Payment; sample form, no date, 1 page.
Transfers require ID made by telegraph; 1895, Tariff Book, 4 pages.
Transpoint, "The Way to Pay Online", downloaded from website http://www.transpoint.com/ on Feb. 10, 2000, 12 pages.
VeriFone Finance, "Fast, Low-Cost Transaction Automation at the Point of Service", Jan. 1999—2 pages.
VisionPLUS Consumer Payment Solution Overview, no date, 2 pages.
Wermer, Sandra; "A million credit card transactions in five hours"; 1997, Primeur, 2 pages.
Western Union—Now, using our service is even more rewarding; no date, 4 pages.
Western Union—Some Quick Facts about Quick Collect; no date, p. 1.
Western Union and Continental Airlines Introduce New Quick and Easy Cash Payment Option When Booking Flights; Jan. 5, 2004, Press Release, 2 pages.
Western Union—BidPay-Buyer FAQs, 1999-2003, 7 pages.
Western Union Creates Phone Card with BLT Technologies; 1997, PR Newswire Association, 2 pages.
Western Union Financial Services, Inc.: Benefits Quick Cash Agreement and Disclosure Statement; 1998, 2 pages.
Western Union Financial Services, Inc.: Cash Card Agreement and Disclosure Statement; 1998, 2 pages.
Western Union Gift Greetings; no date, 6 pages.
Western Union Hotel-Motel Reservation Service, no date, 1 page.
Western Union Money Orders More Popular Than Ever: 1942, Dots and Dashes, vol. 18, No. 3, 2 pages.
Western Union New Supplement: Money Orders delivery through Mailgram: 1975, 2 pages.
Western Union News Supplement: Automatic travelers checks using Western Union; 1975, 2 pages.
Western Union Payment Services, Bidpay and Quick Collect, Online Bill Payment, Online Auction Payments; http://www.westernunion.com/info/osComparePayment.asp, 2005, 2 pages.
Western Union Products and Services: a brief description; 1960, 22 pages.
Western Union Quick Collect: First Data Corporation; 2000-2001,2004; 2 pages.
Western Union Quick Collect: The Fastest way to collect good funds; 1999, 11 pages.
Western Union Quick Collect: The most agents, the most locations, the most experienced; 2000, 2 pages.
Western Union Quick Collect; 3 Easy Ways to Send a Payment: Tn Person, Online or by Phone!; no date, 2 pages.

(56) References Cited

OTHER PUBLICATIONS

Western Union SwiftPay Selected by Sheakley Uniservice to Complete W-2 Reprint Transactions; 2000, PR Newswire Association, 2 pages.
Western Union Telegraph Company; 1933, Money Order Message, 17 pages.
Western Union/Money Zap: Send and receive money easily over the internet; http://www.moneyzap.com/main.asp, printed Dec. 1, 2000, 23 pages.
Western Union's Would-Be Rival; 1990, American Banker, 1 page.
When you're helping a customer make a crucial payment there's no room for guesswork; 2002, Western Union's Professional Collector, 3 pages.
Why Send Your Customers Across Town When You Can Send Them Next Door? 2005, 1 page.
Wijnen, Rene "You've Got Money!", Bank Technology News, Jun. 2000, pp. 1- 4, vol. 13, Issue 6, New York.
x.com, "Do More with Your Money," download from website http://www.x.com., 5 pages., Feb. 7, 2000.
You're sending more than a payment: Point-of-Sale & Merchandising Support Advertising Materials, no date, 2 pages.
You're sending more than a payment: You're sending peace of mind; 2004, 3 pages.
Anonymous: "Payment Systems: Western Union Service for Overdue Accounts Resolving Delinquent Cards," Card News, Potomac: Aug. 13, 1990, vol. 5, Iss 15, p. 4.
Anonymous: "Western Union Service Growing" Bank Letter, New York: May 28, 1990, vol. 14, Iss 21, p. 8.
Cornwell, Ted: "Western Union Reports Growth in Late payment Collection Service." National Mortgage News. New York. May 5, 1997. vol. 21; p. 64.
Amerinet, Inc., "Debit-It!—The Best Idea in Payment Systems Since the Credit Card", downloaded from website http://www.debit-it.com/ on Feb. 7, 2000, 8 pages.
Andrejczak—DIALCG File—American Banker—v164—date May 17, 1999 pp. 2.
Annual Report of the Western Union Telegraph Company, 1975, 3 pages.
Annual Report of the Western Union Telegraph Company; 1978, 2 pages.
Arthas Corp., dotBank, The Way to Send and Receive Money on the Internet, downloaded from website dotbank.com on Feb. 7, 2000.
Arthur, Dwight, "AADS Option for Buyer Authentication", Response to NACHA/IC ANt2 RFI; 2 pages; Sep. 14, 1998.
Author Unknown "PayPal News", www.andrys.com/paypal.html, published prior to 2003, 3 pages.
Author Unknown "PayPal.com Case Study" http://fox.rollins.edu/~slackman/paypal.htm, 2001, 6 pages.
Concord EFS, Inc. brochure entitled "Risk Management Services: IDLogix C100 Handheld Terminal—Detecting Invalid and Counterfeit Identification", published on or before 2005, 4 pages.
Concord EFS, Inc. brochure entitled "Risk Management Services", published on or before 2005, 8 pages.
Confinity, Inc. "PayPal for the Palm", www.handheldnew.com/file.asp?ObjectID=5401, published prior to Oct. 2003, 2 pages.
Confinity, Inc., PayPal.com, How PayPal.com Works, download from website http://www.paypal.com on Feb. 7, 2000, 7 pages.
GAO—Aviation Security-Registered Traveler Program Policy & implementation Issues—Nov. 2002_41 pages.
Greenia—1952 Website computermuseumli—Lexikon Services 1982 2002-2003 pp. 3.
Idealab Company, "PayMe.com," download from website http://ssl.idealab.com on Feb. 16, 2000, 7 pages.
Leading Provider of Transaction Card Processing Selects Connect Oneserver Software as a Solution for Advanced Internet Merchant Services: First Data Chooses OneServer as an Application to Deliver the Internet to Banks and Merchants; 1996, press Release, 4 pages.
McEnaney—DIALCG File 01896530—Akron Beacon Journal—Jul. 12, 1997—3 Pages.
Netscape Announces Netscape Livepayment to Facilitate Internet Commerce; 1996, Netscape News Release, 4 pages.
PR Newswire—Western Union Financial Services forms—Aug. 22, 1991.pdf.
Primary Payment Systems, Inc. brochure entitled "Risk Management Services: Decision Chek On-Site- Detecting Fraudulent Checks at the Point-of-Sale", 2003, 4 pages.
Primary Payment Systems, Inc. brochure entitled "Deposit Check-Preventing Losses on . . . Checks and Other Payments at Financial Institutions", 2002, 2 pages.
Primary Payment Systems, Inc. brochure entitled "Risk Management Services: Decision Chek- Preventing Check Losses at the Point-of-Presentment", 2003, 4 pages.
Primary Payment Systems, Inc. brochure entitled "Risk Management Services: Identity Chek—Web and Developer Service", 2003, 4 pages.
Primary Payment Systems, Inc. brochure entitled "Risk Management Services: Identity Chek-Detecting Fraud when Establishing New Relationships", 2003, 6 pages.
Seifert—Method & System for Electronic Transfer—FDC 0167PUS—no date, 21 pages.
Stoutenburg—Method & System for Performing Money Transfer Transaction—10-289802—no date, 30 Pages.
Stream, LitleNet, BBN, and KPMG Announce Industry-Wide Initiative to Enable Wide-Scale Software Electronic Commerce; 1996, News Release, 6 pages.
VIPS Introduces MCSource to Managed Healthcare Industry; 1996, VIPS Healthcare Information Systems News Release, 2 pages.
Western Union—Quarterly Report 3rd Quarter 1975—4 pages.
Western Union Financial Services Inc.: There's a lot to be said about the many advantages of the Quick Collect service. And look who's saying it; 1995, 4 pages.
Western Union Money Transfer & more—Printed date Jun. 10, 2003, 9 pages.
Western Union Money Transfer Service: Messages with money orders and telephone money order, Feb. 1, 1920, 10th Edition—pp. 119 & 120.
Western Union Money Transfer Services, Send Money Online, Money Orders, Send Telegrams; http://www.westernunion.com/info/osCompareMoneyMessage.asp, 2005, 3 pages.
XP-002347909—Western Union Announces ATM Card Payout for Money Transfer Transactions—Oct. 22, 2001 p. 1.
US 6,460,019, 10/2002, Walker et al. (withdrawn)

\* cited by examiner

MONEY TRANSFER SYSTEM AND MESSAGING SYSTEM

CROSS-REFERENCE TO RELATED APPLICATIONS

This application is a continuation of Ser. No. 11/692,708 filed on Mar. 28, 2007, entitled "MONEY TRANSFER SYSTEM AND MESSAGING SYSTEM," all of which is incorporated by reference, as if fully set forth herein, for any and all purposes.

BACKGROUND OF THE INVENTION

This disclosure relates in general to money transfers and by way of example, but not by way of limitation, to money transfers that include recorded messages amongst other things.

Money transfer systems are well known. Many people use the services of money transfer service providers to send funds to other people or businesses. Electronic communication and banking networks now allow such transactions to have nearly global reach. For example, a sender can go to a Western Union location, provide funds and have the funds transferred to a recipient in any location, such as, China, Mexico, Ghana, New York, etc. A recipient can go to a Western Union location, provide proof of identity and receive funds provided by the sender. The present invention provides various enhancements to such systems.

BRIEF SUMMARY OF THE INVENTION

In one embodiment of the invention, a computerized method of transferring funds from a sender to a recipient with a recorded message is disclosed. The method includes receiving at a host computer system a request for a fund transfer from the sender, receiving a payment from the sender for the fund transfer and transmitting a payment confirmation to the host computer system, assigning an identifier to the fund transfer, receiving a recorded message from the sender and transmitting at least a copy or record of the recorded message to the host computer system, associating the recorded message with the fund transfer at the host computer system, receiving a request from the recipient to receive the recorded message, and providing the recorded message to the recipient. The host computer system may be comprised of a single host computer that handles the fund transfer and recorded message or may be comprised by a plurality of host computers, each handling different aspects of the fund transfer and recorded message, or any part thereof. The sender may make the request for a fund transfer at a transaction processing device, a location, or via the Internet, a telephone or mobile device. The recorded message request from the recipient may include an identifier.

In another embodiment a system for transferring funds from a sender to a recipient with a recorded message is disclosed. The system may include an input adapted to receive at least a fund transfer request and a recorded message from a sender, a storage arrangement configured to store recorded messages; and a processor. The processor may include any of the following: instructions to receive a fund transfer request from the sender, instructions to receive a payment confirmation from a remote system, instructions to receive a recorded message from the sender, instructions to store and associate the recorded message and the fund transfer request with an identifier, instructions to receive a request from the recipient to receive the recorded message; and instructions to provide the recorded message to the recipient.

In another embodiment a computerized method of receiving funds from a sender for transferring the funds to a recipient with a recorded message is disclosed. The method may include receiving from the sender a request for a fund transfer from the sender at the transaction processing device and receiving a payment from the sender for the fund transfer at the transaction processing device. The method may also include sending a payment confirmation from the transaction processing device to a host computer system, receiving an identifier from the host computer system associated with the fund transfer, and providing the identifier to the sender at the transaction processing device. At the recipient side, the method may include receiving the identifier from the sender at the host computer system, and receiving a recorded message from the sender at the host computer system.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides for a money transfer system that includes a recorded message. A sender sends funds to a recipient with a recorded message. The recorded message may include audio, video, text or images. The recorded message may be received through a telephone, text message or over the Internet (for example, via a web page, e-mail or instant message). The recorded message may also be received through a microphone or video camera at a point of sale location, at a manned or unmanned kiosk, or at an ATM. The microphone or video camera may also be connected to a personal computer. The recorded message may be saved on a computer system in any format.

The funds and the recorded message may be associated with an identifier, such as a money transfer control number (MTCN). The identifier may be any unique identifier (e.g., a string of numbers, letters or other characters), or could be a set of identifiers (e.g., that could be combined together to provide a unique identifier). The system generates the identifier for the sender to provide to the recipient, e.g., when the sender informs the recipient that the money is available for pick-up. When the recipient then visits a money transfer location to pick-up the transferred money, the identifier provides a convenient reference to permit a record of the transfer (including, e.g., the name of the recipient and the amount transferred) to be automatically retrieved at the money transfer location for cash payout to the recipient and to receive the recorded message. The recorded message may be received by the recipient over the phone, via the Internet, as written message, as a text message, and/or from a messenger in song or prose. Another embodiment of the invention provides for a fund transfer notification to be sent to the sender, the recipient or a third party at various times before, during or after a fund transfer.

Figure 1:
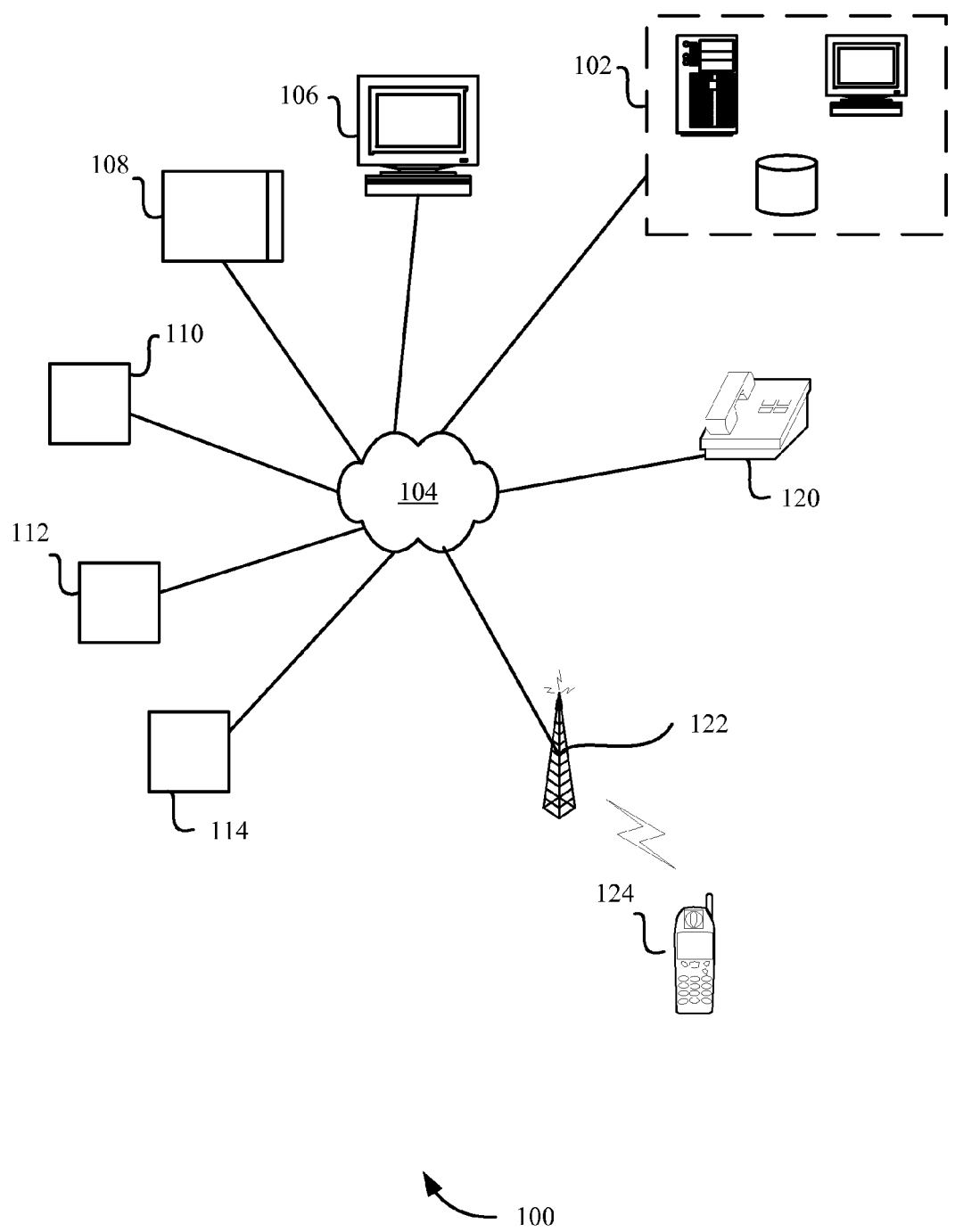
FIG. 1 illustrates a money transfer and messaging system according to one embodiment of the invention.

Having described embodiments of the present invention generally, attention is directed to FIG. 1, which illustrates a money transfer and messaging system 100 according to one embodiment of the present invention. The system 100 is not to be considered limiting. Embodiments of the present invention may be embodied in the system 100 or other suitable system.

The system 100 includes a host computer system 102 and a network 104. The host computer system 102 may include, for example, server computers, personal computers, web servers, workstations, web servers, and/or other suitable computing devices. The host computer system 102 includes application software that programs the host computer system 102 to perform one or more functions according to the present invention. For example, application software resident on the host computer system 102 may program the host computer system 102 to process money transfer records according to embodiments of the present invention. The host computer system 102 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The host computer system 102 may be fully located within a single facility or distributed geographically, in which case a network may be used to integrate the host computer system 102. Many other examples are possible and apparent to those skilled in the art in light of this disclosure. The system 100 may also include a telephone system. The telephone system may receive and communicate recorded messages as well as other information related to a money transfer.

The network 104 may be the Internet, an intranet, a wide area network (WAN), a local area network (LAN), a virtual private network, any combination of the foregoing, or the like. The network 104 may include both wired and wireless connections, including optical links. In some embodiments, the network 104 may include a money transfer network. In some embodiments, the network 104 may include a public switched telephone network (PSTN). Through the network 104, transaction devices communicate with the host computer system 102.

The system 100 also includes one or more transaction processing devices 106, 108, 110, 112, 114. Transaction processing devices may be any of a number of devices capable of receiving money transfer requests from a sender and/or dispensing money to a recipient. A transaction processing device may be, for example, a personal computer 106 or other computing device. The personal computer 106 may be any of a variety of computing devices such as a personal computer, laptop computer, desktop computer, personal digital assistant (PDA), mobile phone or the like. Using such a device, a sender may initiate a money transfer request that is settled from the sender's checking account, savings account, credit card, debit card, ATM card, prepaid card, stored value card, stored value account or the like. The personal computer may be connected to the Internet and may access the money transfer system over the Internet.

The system 100 may also include a point-of-sale (POS) device 108. POS devices are more fully described in U.S. Pat. No. 6,547,132, issued on Apr. 15, 2003, the entire disclosure of which is incorporated herein by reference for all purposes. Essentially, POS devices are terminals for receiving transaction information and sending the information to a host computer system. For example, a POS may receive transaction information by capturing it from a card using a reader integral to or associated with the POS. A POS also may receive information from an attendant or sender via a keypad, keyboard, microphone, biometric reader, magnetic scanner, radio frequency identification (RFID) terminal reader and/or other input device. Other examples are possible. POS devices are typically located at money transfer service provider locations. POS devices such as the POS 108 may be attended or unattended and may be used by a recipient to redirect funds to an account or another recipient.

The system 100 also may include one or more computing devices 110 programmed to receive money transfer information from senders or attendants. The computing device 110 may be any of the aforementioned computing devices. Like the POS devices 108, the computing devices 110 may be located at money transfer service provider locations. At such locations, an attendant usually enters the money transfer information after the customer (sender or recipient) has completed an appropriate money transfer form.

The system also may include one or more Customer Service Representative (CSR) computers 112. The CSR computers 112 may be located, for example, at a call center operated by or for a money transfer service provider. The CSR computers 112 function much like the POS devices 108 and/or the computing devices 110. At the CSR computer 112, transaction information may be entered by a CSR who is receiving the information from a sender by phone, for example. In some examples, a voice response unit may receive some or all of the information. The voice response unit may include an interactive voice response system.

The system 100 also may include one or more unmanned transaction devices 114 such as a multi-purpose kiosk or an automated teller machine (ATM). ATMs are well known; kiosks are more fully described in co-pending, commonly assigned U.S. patent application Ser. No. 10/225,410, filed on Aug. 20, 2002, the entire disclosure of which is incorporated herein by reference for all purposes. Unmanned transaction devices 114, such as kiosks and ATMs, may be used for both send and receive transactions since such devices typically are configured to dispense cash, money orders, and/or other forms of value.

According to one embodiment of the present invention, a sender presents himself to a money transfer location. The location may be equipped with any of the aforementioned devices. The sender enters transaction information into the transaction processing device, completes a form that an attendant uses to enter information into a transaction processing device, provides the information verbally to an attendant, either in person or remotely, by phone for example, and/or the like. In some embodiments, the sender provides some or all of the information by presenting a loyalty card or other personal information card that has the information stored on it or serves to identify an account from which the information may be obtained. The transaction information includes an amount of value to be transferred, a recipient identifier, a sender identifier, and/or the like. According to some embodiments of the invention, the transaction information also includes instructions to notify one or more transaction parties or third parties about the progress of the transaction. Thus, the system also includes various components to perform these functions.

The sender may present a recorded message that may be transferred to the recipient either before, after or when the funds are transferred to the recipient. The sender may record a recorded message at the sender's personal computer 106, at the POS device 108, at the computing device 110, at the CSR 112, or the unmanned transaction devices 114. The sender may also record the recorded message by calling from a telephone 120 or by calling or sending a text message from a mobile device 124 through a receiver 122 and communicating with the host system 102 through the network. The message may be recorded as an audio, video, text, photographic or illustrative message. In order to record the recorded message, each of the prior mentioned devices may include a recording device such as a voice recorder, video recorder, camera, keyboard, or handwriting recording pad. The recorded message may be recorded in analog or digital format. In one embodiment of the invention the recorded message may be recorded in analog format and converted to digital. The recorded message may be then saved at the host computer system 102. The recorded message may be saved in any format. For example, the recorded message may be saved as a mpg, mp3, way, mpeg, AAC, WMA, ram, jpg, giff, mp4, quicktime, png, tiff, wmv or any other similar format.

For example, the sender may request a money transfer at a point of sale location and provides funds for the transfer. The sender may be then provided with at least an MTCN and a phone number where they may record a message. The MTCN and phone number may be included on a printed receipt. The phone number may also be presented on Point-of-Sale material (such as posters or brochures), a money transfer form, a computer screen, an ATM or kiosk screen, a mobile phone or other mobile device or any other device where the sender receives information about the fund transfer. The sender may then call the phone number where they are presented, for example, with an interactive voice response (IVR) system, that may include a voice response unit (VRU). The IVR may prompt the sender for the MTCN. Once the MTCN may be entered and confirmed the sender may be prompted to record a message. Once recorded, the recorded message may be saved at the IVR system and associated with the MTCN. In another embodiment, the IVR system forwards the recorded message to the host computer system 102 where the recorded message may be associated with the MTCN. In another embodiment, the IVR may call the recipient over the phone and communicate the recorded message to the recipient or may provide information about how the recipient may retrieve the recorded message. The recipient may retrieve the recorded message over the telephone via IVR or CSR, over the Internet, on a mobile device, at a kiosk or ATM, or at a location. The IVR may also provide information about where, when and/or how the funds may be received.

As another example, the sender may be provided with an MTCN and a webpage where they may record a message. The MTCN and webpage URL may be included on a printed receipt. The webpage URL may also be presented on Point-of-Sale material (such as posters or brochures), a money transfer form, a computer screen, an ATM or kiosk screen, a mobile phone or other mobile device or any other device where the sender receives information about the fund transfer. The sender may then use a computer connected to the Internet to visit the webpage. Once at the webpage, the sender may enter the MTCN and type in, upload or record a recorded message. The recorded message may include audio, video, text or image files. Once recorded, the recorded message may be saved at host computer system 102 and associated with the MTCN. In one embodiment the webpage may be managed and hosted by the host computer system 102. In another embodiment, the webpage may be separately managed and hosted. The webpage system may then forward the recorded message to the host computer system 102 where the recorded message may be associated with the MTCN. The recipient may then receive a message from the sender that funds are being held for them. The message may also include the MTCN. The recipient may then enter at least the MTCN into a webpage whereupon they may receive the recorded message. The webpage may also direct the recipient to a location where they may receive the funds or instruct the recipient on how to transfer the funds to a bank account or stored value account. In another embodiment, the host computer system 102 may email the message to the recipient directly with a copy of the recorded message. The email may also direct the recipient regarding access to the funds. The host computer system may be comprised of a single host computer that handles the fund transfer and recorded message or may be comprised by a plurality of host computers, each handling different aspects of the fund transfer and recorded message, or any parts of either. When a plurality of host computers are used to provide a fund transfer and recorded message, each host computer may be operated by different parties and/or at different locations.

In another embodiment of the invention, the host computer system 102, sends the recorded message or notification thereof to the recipient of the funds transfer. In this embodiment, the sender may enter the recipient's phone number, address, email address or other contact information when requesting a money transfer. The host computer system 102 may send the recorded message as an audio recording to the recipient's telephone 120 or mobile phone 124 as specified by the sender. In other embodiments the host computer system 102 may send the recorded message as an audio, video, image or text message through short message service ("SMS"), instant messaging ("IM"), or in the body of an email or as an email attachment to the recipient. In another embodiment, the recipient may be given a phone number to call where they may receive the recorded message. In other embodiments the recorded message may be transcribed to a format that is different than the format used to record the message. For example, a recorded message saved in an audio format may be sent to the recipient as an email, text message or fax. The message may also by posted on a password secured webpage. A transcribed message may also be sent by a courier, mail or other delivery means. The recorded message may also be read or sung by a delivery person.

The recorded message may be combined with information from the host computer system 102. The host computer system 102 may communicate information to the recipient such as: locations where the recipient may collect funds from the fund transfer, the amount of the funds, the information required to retrieve the funds, etc.

In another embodiment of the invention, the host computer system 102 may notify the sender that the recipient received the recorded message and/or that the recipient collected the funds. Those skilled in the art will appreciate many other examples in light of this disclosure.

Figure 2:
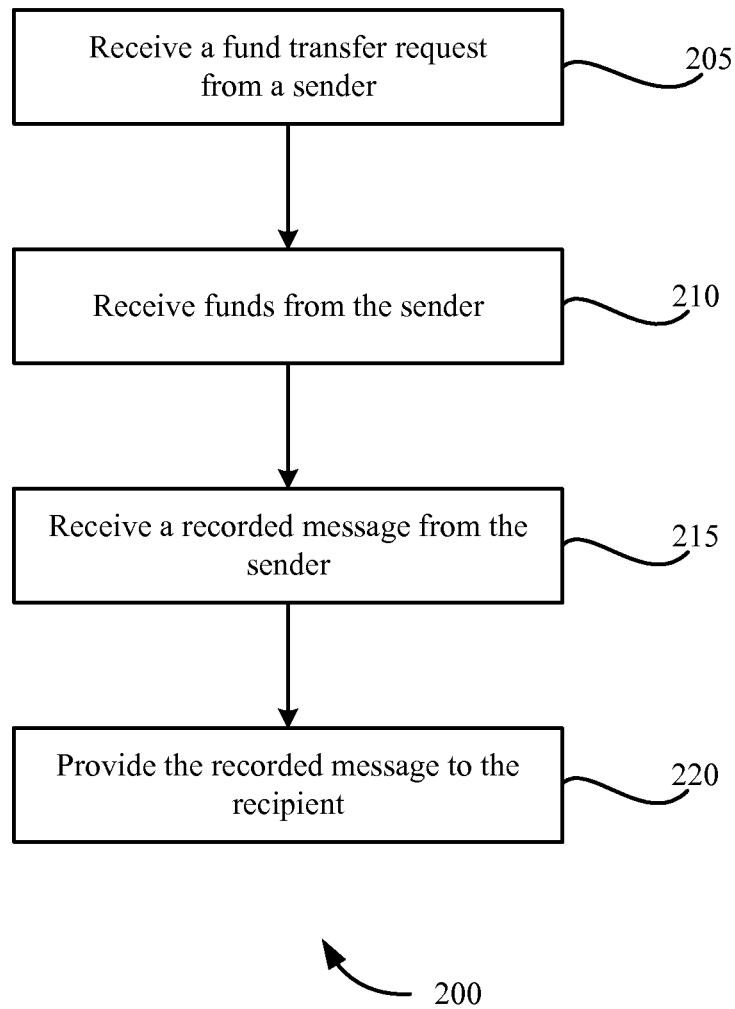
FIG. 2 illustrates a flow chart of a money transfer and messaging system according to one embodiment of the invention.

FIG. 2 illustrates a flow chart 200 of a money transfer and messaging system according to one embodiment of the invention. A funds transfer request may be received from a sender 205. The funds transfer request may be received at any location discussed above in regard to FIG. 1 or any other location. The funds transfer request may also be received by telephone, via the Internet, at a kiosk or ATM, or from a mobile device.

The funds transfer request may include a payment amount, sender's name, address and/or phone number, and recipient's name address and/or phone number. Other information may be included in the funds transfer request. For example, the money transfer request may include details about the sender including the sender's name, address, phone number, etc. The money transfer request may also include details about the recipient including the recipients name, address, phone number, etc. Funds may also be received from the sender 210. Funds may be received at the same the location as the funds transfer request or at a different location. The funds may include a money transfer fee and/or taxes as well as the funds to be transferred to the receiver. The funds may be received through a credit card, ATM card, prepaid card, stored value card, stored value account, debit card, cash, check, money order, bank account or any other payment device.

In another embodiment of the invention, the system assigns an identifier to the fund transfer, such as an MTCN. A receipt may be provided to the sender that includes the MTCN. The transaction and transaction information may then be sent to the host computer system 102.

The system receives a recorded message from the sender 215. In one embodiment, the recorded message may be received at the same time and/or the same location that the funds transfer request was received. In another embodiment, the recorded message may be received at a different time and/or a different location. For example, the sender may request a fund transfer and deposit funds at a POS location. The sender may be provided with a receipt of the transaction that includes a telephone number that the sender may call to record a message. Moreover, the message may be recorded over the phone 120 or mobile phone 124, through a microphone or camera at a POS location 108, over the Internet from the sender's personal computer 106, over the telephone from a CSR 112 or through a microphone or video camera at an unmanned or manned location. The receipt may also provide a webpage where the sender may provide a recorded message. The sender may be asked to provide relevant details about the money transfer in order to record a message. For example, the sender may be asked to provide an identifier, such as, the MTCN. The recorded message may be an audio, video, text, photographic, illustrative or other image message. The recorded message may be sent to the recipient 220 either before, after or with the funds. The recipient may also receive the recorded message and decline receipt of the funds. The format of the recorded message as it is received by the recipient may be the same or different than the format of the recorded message that was recorded by the sender of the fund transfer.

Figure 3:
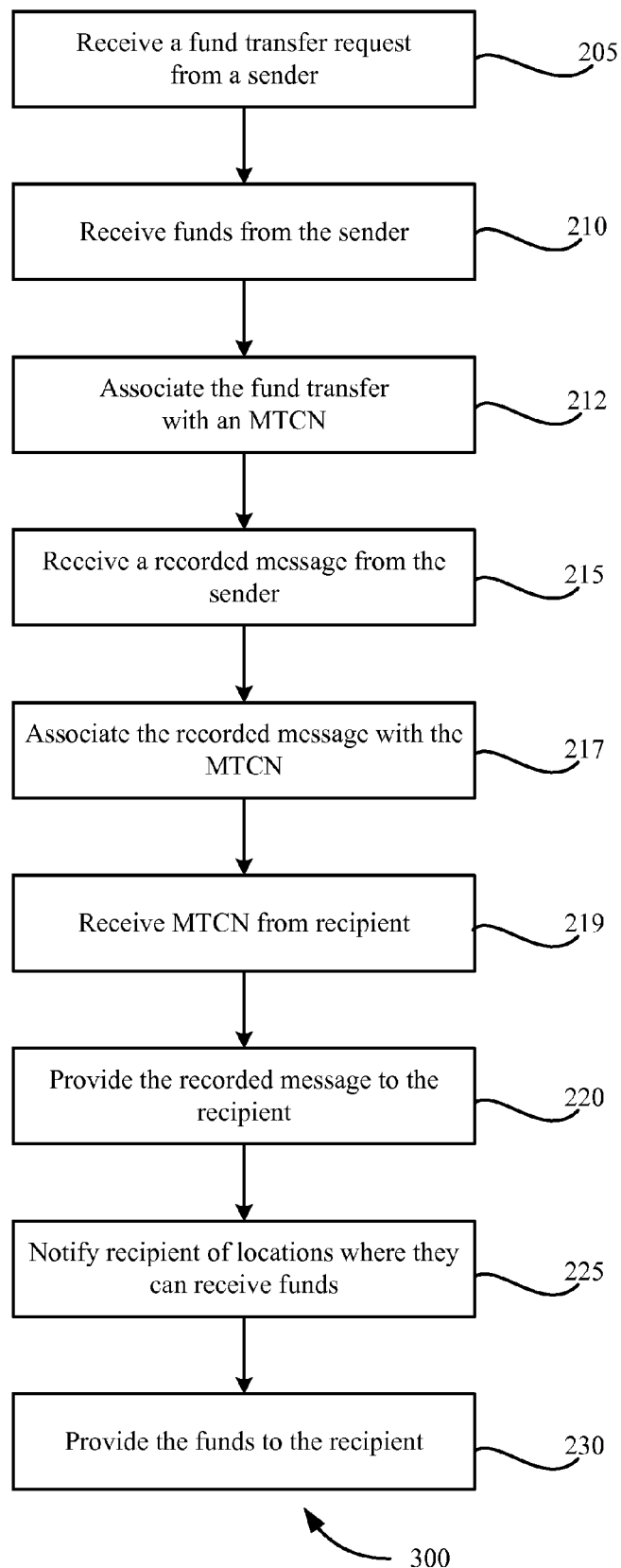
FIG. 3 illustrates a flow chart of a money transfer and messaging system according to one embodiment of the invention.

FIG. 3 illustrates a flow chart 300 of a money transfer and messaging system according to one embodiment of the invention. In this embodiment, a fund transfer request may be received 205 along with funds 210. The funds may include money transfer fees or taxes. The funds may be associated with an identifier, such as an MTCN 212. For example, a notation in a financial account may be made relating the funds to the MTCN. At some point, a recorded message may be received from the sender 215. The recorded message may also be associated with the MTCN 217. The sender may then communicate the MTCN to the recipient who may then present the MTCN to the system 219. The recorded message may be provided to the recipient 220. The host computer system 102 or the sender may send the recorded message to the recipient. For example, the recorded message may be played over the phone or over a computer. The recorded message may be provided on a CD or other recordable medium. The recorded message may be transcribed and provided on paper. The recorded message may also be spoken or sung. In another embodiment, the recorded message may also include directions to a nearby location where the funds may be received 225 or how the funds may be electronically transferred to an account of the recipient's. The funds may be paid to the recipient upon reception of the MTCN 230.

For example, the sender may request a money transfer through an ATM machine 205 where the funds are transferred from the sender's account to the money transfer system 210. The sender enters any required recipient information. The host computer system 102 associates the funds transfer request with an MTCN 212. Later, the sender may wish to include a message with the fund transfer, whereupon the sender may call a telephone system or access another system and record a message 215. The sender may be required to enter or otherwise communicate the MTCN in order to leave a recorded message. The MTCN may be then associated with the recorded message.

In some embodiments, the money transfer may require the use of a personal identification number (PIN) and/or MTCN. For example, a financial instrument may be constructed so that upon receipt of the PIN (whether by being printed on a receipt or being provided in some other manner to the sender at a transaction processing device), the sender may record the PIN on the instrument at a location that will be generally concealed from others. Likewise, when the same sender contacts the money transfer provider or system to complete the transfer request and receives an MTCN, that number may also be recorded on the instrument so as to be generally concealed from others, in order to minimize the risk of it being discovered and used by an unauthorized person.

The MTCN may then be communicated to the recipient from the sender. The recipient may subsequently call a telephone system and enter the MTCN 219. The telephone system may include an IVR system. Accordingly, the telephone system may ask the recipient to enter the MTCN on the phone keypad or by voice. The recipient may then be presented with a number of options, such as, listen to recorded message from the sender, locate nearby locations where the funds may be retrieved 225, transfer funds to an account, and/or decline the fund transfer, etc. If the recipient elects to listen to the recorded message, then the recorded message may be played 220. The recipient may then receive the funds. In another embodiment, the sender may require that the recipient receive the recorded message prior to releasing the funds.

A number of variations and modifications of the disclosed embodiments may also be used. For example, the receiver may receive the MTCN via email from the system. The email may include the message as an attachment or as a link in the email message to a webpage. In another embodiment, the recipient may enter the MTCN at a webpage on a computer connected to the Internet. A copy of the recorded message may then be downloaded and played on recipient's computer or a connected device such as an MP3 player. A copy of the recorded message may also be forwarded by the recipient to another device, such as a mobile device with SMS capability. Furthermore, the webpage may have options for the recipient to transfer the funds to one of the recipient's accounts. The webpage may also present a list of locations where the funds may be received. The recorded message may then by played, either as audio or as a video, on the recipient's computer. The webpage may also stream the recorded message to the recipient's computer. In another embodiment, the telephone system automatically calls the receiver and plays the recorded message or leaves the recorded message on an answering machine or in voicemail.

According to another embodiment of the present invention, parties to or interested in a financial transaction may receive notifications relating to particular steps in the process. For example, a sender in a money transfer transaction may request to be notified when the recipient to whom the sender is sending the money, actually picks up the money and/or retrieves the recorded message. The sender may request to be notified by phone, facsimile, email, letter, text message, instant message, telegram, or the like. Attempted notifications may continue until the sender receives actual notification, until a specified time passes, or the like. Notification attempts also may end if the sender's voice mail or answering machine accepts a message. The sender may specify any of these preferences at the time of initiating a transfer or may establish a profile that includes the preferences. In another example, the sender may request to be notified after a specified period of time that the recipient has not picked up the money. The notifications may continue until the recipient does pick up the money.

The sender also may request that the recipient receive notification of a fund transfer and/or a recorded message. The notification to the recipient may be by any of the means previously described. The recipient's notification also may be triggered by a profile established by the recipient. In such cases, even if the sender does not specify sending a notification to the recipient, the recipient may nevertheless receive one by virtue of the pre-established profile.

Recipients also may initiate one or more notifications, for example to the sender in a money transfer transaction or to another interested party. As an example, the recipient may wish to send a "thank you" message to the sender. If the recipient is a collection agent of a creditor, the recipient may wish to send a notification to the creditor and/or the sender that a payment has been received. Other examples are possible.

Embodiments of the invention also provide for notifying third parties. For example, if a person pays a creditor on behalf of a debtor, the debtor may be notified that the creditor has received the money. As another example, if a sender (e.g., debtor) transfers money to a third party (e.g., collections agent) for the benefit of a creditor, the sender may request that the creditor be informed that the sender has initiated the transfer. The creditor may then act on the information, for example, by suspending eviction proceedings. In any case—sender notification, recipient notification, third party notification—the notification may include instructions the notified party may follow to alter future notifications or opt out of notifications all together.

In some embodiments, it is not necessary for one or more parties to request the notification. Parties may be notified as a rule. The parties, however, may opt out of receiving notifications, as will be described.

In some embodiments, notifications may include audio, video, text, photographic, illustrative or other image messages. These notifications may be recorded by one party to be sent to another party. In this way, a recorded message may be more personalized.

Notifications according to embodiments of the invention may take different forms and may relate to other services. In one example, a sender transfers money to himself to be withdrawn periodically as the sender desires. Such transactions are useful for travel to avoid having to carry sums of cash. The sender may request to be notified when his balance falls below a particular threshold. In another example, a sender deposits a sum of value to a presentation instrument or account, such as a gift card, a stored value card, a prepaid services account, or the like. The sender may request to be notified when the available balance falls below a predetermined threshold. In another example, a sender may request to receive a periodic summary of activity relating to a money transfer transaction.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

What is claimed is:

1. A method comprising:
   receiving, at a first computer system, a first request for a fund transfer from a sender to a stored value account;
   receiving, at the first computer system, a confirmation that a payment from the sender has been made for the fund transfer;
   assigning, at the first computer system, an identifier to the fund transfer;
   receiving, at the first computer system or a second computer system, a recorded voice message from the sender;
   receiving, with the first computer system or the second computer system, a second request from the sender that the recorded voice message is provided to the recipient prior to activation of a financial instrument associated with the stored value account;
   associating, at the first computer system or the second computer system, the recorded voice message with the stored value account;
   receiving, at the first computer system or the second computer system, a third request from a recipient, wherein the third request includes the identifier; and
   providing, from the first computer system or the second computer system, the recorded voice message to the recipient after receiving the third request.

2. The method of claim 1, wherein the first request for the fund transfer is received via a web page interface.

3. The method of claim 1, wherein the identifier assigned to the fund transfer comprises a stored value account number.

4. The method of claim 1, wherein the recorded voice message from the sender is received by the first computer system or the second computer system after payment is received from the sender.

5. The method of claim 1, wherein the third request is received via telephone, and the recorded voice message is provided via telephone.

6. The method of claim 1, wherein the method further comprises:
   activating the financial instrument in response to the third request.

7. A system comprising:
   at least one computer system configured to:
      receive a first request for a fund transfer from a sender to a stored value account;
      receive a confirmation that a payment from the sender has been made for the fund transfer;
      assign an identifier to the fund transfer;
      receive a textual message from the sender;
      receive a second request from the sender that the textual message is provided to the recipient prior to activation of a financial instrument associated with the stored value account;
      associate the textual message with the stored value account;
      cause the textual message and a financial instrument to be delivered to the recipient; and
      receive a third request from a recipient, wherein the third request includes the identifier.

8. The system of claim 7, wherein the textual message and the financial instrument are delivered to the recipient via mail.

9. The system of claim 7, wherein the at least one computer system is further configured to:
   activate the financial instrument in response to the third request.

10. A non-transitory machine readable storage medium having instructions stored thereon, wherein the instructions are executable by one or more processors to at least:
    receive a first request for a fund transfer from a sender to a stored value account;
    receive a confirmation that a payment from the sender has been made for the fund transfer;
    assign an identifier to the fund transfer;
    receive a textual message from the sender;
    receive a second request from the sender that the textual message is provided to the recipient prior to activation of a financial instrument associated with the stored value account;
    associate the textual message with the stored value account;
    cause the textual message and a financial instrument to be delivered to the recipient; and
    receive a third request from a recipient, wherein the third request includes the identifier.

11. A method comprising:
    receiving, at a first computer system, a first request for a fund transfer from a sender to a stored value account;
    receiving, at the first computer system, a confirmation that a payment from the sender has been made for the fund transfer;
    assigning, at the first computer system, an identifier to the fund transfer, wherein the identifier comprises a stored value account number;
    receiving, at the first computer system or a second computer system, a recorded voice message from the sender;
    associating, at the first computer system or the second computer system, the recorded voice message with the stored value account;
    receiving, at the first computer system or the second computer system, a second request from a recipient, wherein the second request includes the identifier; and
    providing, from the first computer system or the second computer system, the recorded voice message to the recipient after receiving the second request.

12. A system comprising:
    at least one computer system configured to:
    receive a first request for a fund transfer from a sender to a stored value account;
    receive a confirmation that a payment from the sender has been made for the fund transfer;
    assign an identifier to the fund transfer, wherein the identifier comprises a stored value account number;
    receive a textual message from the sender;
    associate the textual message with the stored value account;
    cause the textual message and a financial instrument to be delivered to the recipient; and
    receive a second request from a recipient, wherein the second request includes the identifier.

13. A non-transitory machine readable storage medium having instructions stored thereon, wherein the instructions are executable by one or more processors to at least:

receive a first request for a fund transfer from a sender to a stored value account;
receive a confirmation that a payment from the sender has been made for the fund transfer;
assign an identifier to the fund transfer, wherein the identifier comprises a stored value account number;
receive a textual message from the sender;
associate the textual message with the stored value account;
cause the textual message and a financial instrument to be delivered to the recipient; and
receive a second request from a recipient, wherein the second request includes the identifier.

* * * * *